US012683937B2

(12) United States Patent
Wakabayashi

(10) Patent No.: US 12,683,937 B2
(45) Date of Patent: Jul. 14, 2026

(54) COMMUNICATION NETWORK NODES, METHODS FOR PROVIDING COMMUNICATION NETWORK NODES, TERMINAL DEVICE, METHOD FOR OPERATING A TERMINAL DEVICE, METHODS FOR COMMUNICATION NETWORKS

(71) Applicant: Sony Group Corporation, Tokyo (JP)

(72) Inventor: Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 140 days.

(21) Appl. No.: 18/277,771

(22) PCT Filed: Feb. 25, 2022

(86) PCT No.: PCT/EP2022/054739
§ 371 (c)(1),
(2) Date: Aug. 18, 2023

(87) PCT Pub. No.: WO2022/184558
PCT Pub. Date: Sep. 9, 2022

(65) Prior Publication Data
US 2024/0154940 A1　　May 9, 2024

(30) Foreign Application Priority Data
Mar. 1, 2021　(EP) ..................................... 21160025

(51) Int. Cl.
*H04L 9/40*　　(2022.01)
(52) U.S. Cl.
CPC .......... *H04L 63/0407* (2013.01); *H04L 63/12* (2013.01)

(58) Field of Classification Search
CPC ........................... H04L 63/0407; H04L 63/12
See application file for complete search history.

(56) References Cited

U.S. PATENT DOCUMENTS

| 11,645,416 B1 * | 5/2023 | Fakhraie ............. G06F 21/6245 |
| | | 705/50 |
| 11,763,311 B2 * | 9/2023 | Wagner ............... H04L 63/0861 |
| | | 726/7 |

(Continued)

FOREIGN PATENT DOCUMENTS

| WO | 2020/064545 A1 | 4/2020 |
| WO | 2020/083822 A1 | 4/2020 |

(Continued)

OTHER PUBLICATIONS

Reed et al., (2019). Decentralized Identifiers (DIDs) v0.13 Data Model and Syntaxes. W3C, Aug. 10, 2019, https://www.w3.org/2019/08/did-20190828/ (Year: 2019).*

(Continued)

*Primary Examiner* — Lizbeth Torres-Diaz
(74) *Attorney, Agent, or Firm* — XSENSUS LLP

(57) ABSTRACT

The present disclosure generally pertains to a communication network node for providing a distributed ledger, including circuitry configured to: generate an anonymous identifier for providing an anonymous identification of a user of a mobility management provider to a mobility service provider, wherein the anonymous identifier is generated based on a request of a personal data management provider to the distributed ledger.

22 Claims, 10 Drawing Sheets

(56)                References Cited

U.S. PATENT DOCUMENTS

| | | | |
|---|---|---|---|
| 2004/0098625 A1* | 5/2004 | Lagadec | G06Q 20/383 |
| | | | 726/4 |
| 2006/0053296 A1* | 3/2006 | Busboom | H04L 63/20 |
| | | | 726/4 |
| 2014/0047524 A1* | 2/2014 | Auger | H04L 63/0853 |
| | | | 726/7 |
| 2019/0104102 A1* | 4/2019 | Khan | G06F 16/27 |
| 2020/0145223 A1* | 5/2020 | Yang | H04L 63/08 |
| 2020/0145229 A1 | 5/2020 | Li | |
| 2021/0011905 A1* | 1/2021 | Uhr | H04L 9/0637 |
| 2023/0169154 A1* | 6/2023 | Chua | G06Q 30/0185 |
| | | | 726/26 |

FOREIGN PATENT DOCUMENTS

| | | |
|---|---|---|
| WO | 2020/120672 A1 | 6/2020 |
| WO | 2020/152213 A1 | 7/2020 |
| WO | 2021/151767 A1 | 8/2021 |
| WO | 2021/151868 A1 | 8/2021 |

OTHER PUBLICATIONS

International Search Report and Written Opinion mailed on Jun. 2, 2022, received for PCT Application PCT/EP2022/054739, filed on Feb. 25, 2022, 13 pages.

Gkemou et al., "A User and Stakeholder-Driven Approach for Cross-Border, Seamless and Personalised Maas Provision", XP055926306, Retrieved from the Internet: URL:https://zenodo.org/record/4434357/file s/chapter.pdf?download=I, Jun. 25, 2020, pp. 254-268.

"Public-key cryptography", Wikipedia, Available Online at: https://en.wikipedia.org/wiki/Public-key_cryptography, Retrieved from the net on Feb. 25, 2021, 1 page.

"Art. 4 GDPR Definitions", General Data Protection Regulation (GDPR), Available Online at: https://gdpr-info.eu/art-4-gdpr/, Retrieved from the net on Feb. 25, 2021, pp. 1-4.

"Decentralized Identity Own and control your identity", Microsoft, Available Online at: https://query.prod.cms.rt.microsoft.com/cms/api/am/binary/RE2DjfY, 2018, pp. 1-23.

"A Primer for Decentralized Identifiers", GitHub, Available Online at: https://w3c-ccg.github.io/did-primer/, Retrieved from the net on Mar. 2, 2021, pp. 1-8.

Paulo Catalao Querido, " Blockchain based Identity Management and Ticketing for MaaS", Retrieved from the Internet: URL:https://repositorio.ul.pt/bitstream/10 451/48420/l/u1fc126418_tm_Paulo_Querido.pdf, Jan. 1, 2020, pp. 1-46.

Tri Hong Nguyen et al. "Blockchain-based Mobility-as-a-Service", 2019 28th International Conference on Computer Communication and Networks (ICCCN), Jul. 29, 2019, 8 pp.

* cited by examiner

Block # N-1

Block # N

Block # N+1

101a

101b

101c

110

Request for validation <u>111</u>

Check validity <u>112</u>

Indicate results to other nodes <u>113</u>

Check consensus based on results <u>114</u>

If consensus, finalize blockchain <u>115</u>

Finish blockchain procedure <u>116</u>

130

COMMUNICATION NETWORK NODES, METHODS FOR PROVIDING COMMUNICATION NETWORK NODES, TERMINAL DEVICE, METHOD FOR OPERATING A TERMINAL DEVICE, METHODS FOR COMMUNICATION NETWORKS

CROSS-REFERENCE TO RELATED APPLICATIONS

The present application is based on PCT filing PCT/EP2022/054739, filed Feb. 25, 2022, which claims priority to European Patent Application No. 21160025.9, filed Mar. 1, 2021, the contents of each are hereby incorporated by reference.

TECHNICAL FIELD

The present disclosure generally pertains to communication network nodes, methods for providing communication network nodes, a terminal device, a method for operating a terminal device, and methods for communication networks, in particular for providing mobility as a service.

TECHNICAL BACKGROUND

Generally, it is known to distribute a ledger over multiple nodes such as entities, e.g. electronic devices, servers or the like, which record digital transactions. Distributed ledgers can be based on the known blockchain technology, on which, for example, the known cryptocurrency bitcoin is based, but also the well-known Ethereum project, etc. Generally, a distributed ledger may also be implemented on other technologies than the blockchain technology and examples of distributed ledger projects which are not based on blockchain are BigchainDB and IOTA or the like. For instance, IOTA is a crypto currency which uses linked lists.

Moreover, mobility as a service (MaaS) is known, where a user or passenger uses mobility as a service without owing, for example, a car or the like. Mobility as a service may combine public (e.g. train, bus, etc.) and private (e.g. car sharing, bicycle sharing, etc.) transportation services from associated operators or providers.

Known MaaS solutions typically involve a central and unified gateway through which a trip or journey is planned and booked, wherein a user may pay with a single account.

Although there exist techniques for providing a distributed ledger and mobility as a service, it is generally desirable to provide a communication network node, a user equipment, a communication network and a method for providing mobility as a service.

SUMMARY

According to a first aspect, the disclosure provides a communication network node for providing a distributed ledger, comprising circuitry configured to:

generate an anonymous identifier for providing an anonymous identification of a user of a mobility management provider to a mobility service provider, wherein the anonymous identifier is generated based on a request of a personal data management provider to the distributed ledger.

According to a second aspect, the disclosure provides a method for providing a communication network node for providing a distributed ledger, the method comprising:

generating an anonymous identifier for providing an anonymous identification of a user of a mobility management provider to a mobility service provider, wherein the anonymous identifier is generated based on a request of a personal data management provider to the distributed ledger.

According to a third aspect, the disclosure provides a communication network node comprising circuitry configured to:

request an anonymous identifier for providing an anonymous identification of a user of a mobility management provider to a mobility service provider, wherein the request is directed to a communication network node for providing a distributed ledger.

According to a fourth aspect, the disclosure provides a method for providing a communication network node, the method comprising:

requesting an anonymous identifier for providing an anonymous identification of a user of a mobility management provider to a mobility service provider, wherein the request is directed to a communication network node for providing a distributed ledger.

According to a fifth aspect, the disclosure provides a terminal device comprising circuitry configured to:

authenticate a user of the terminal device at a communication network node, such that the communication network node requests an anonymous identifier for providing an anonymous identification of the user to a mobility service provider, wherein the request is directed to a communication network node for providing a distributed ledger.

According to a sixth aspect, the disclosure provides a method for operating a terminal device, the method comprising:

authenticating a user of the terminal device at a communication network node, such that the communication network node requests an anonymous identifier for providing an anonymous identification of the user to a mobility service provider, wherein the request is directed to a communication network node for providing a distributed ledger.

According to a seventh aspect, the disclosure provides a communication network node for providing a mobility management provider, comprising circuitry configured to:

provide candidate routes to a user based on a request of the user which is issued based on an anonymous identifier for providing an anonymous identification of the user to a mobility service provider, wherein the anonymous identifier is generated based on a request of a personal data management provider to the distributed ledger.

According to an eight aspect, the disclosure provides a method for providing a communication network node for providing a mobility management provider, the method comprising:

providing candidate routes to a user based on a request of the user which is issued based on an anonymous identifier for providing an anonymous identification of the user to a mobility service provider, wherein the anonymous identifier is generated based on a request of a personal data management provider to the distributed ledger.

According to a ninth aspect, the disclosure provides a communication network node for providing a distributed ledger, comprising circuitry configured to:

store an anonymous identifier which is generate in a distributed ledger for providing an anonymous identification of a user of a mobility management provider to a mobility service provider, wherein the anonymous identifier is generated based on a request of a personal data management provider.

According to a tenth aspect, the disclosure provides a method for providing a communication network node for providing a distributed ledger, the method comprising:

storing an anonymous identifier which is generate in a distributed ledger for providing an anonymous identification of a user of a mobility management provider to a mobility service provider, wherein the anonymous identifier is generated based on a request of a personal data management provider.

According to an eleventh aspect, the disclosure provides a communication network node for providing a mobility service provider, comprising circuitry configured to:

accept an anonymous identifier of a user for booking a journey with the mobility service provider, wherein the anonymous identifier is generated for providing an anonymous identification of the user of a mobility management provider to the mobility service provider, wherein the anonymous identifier is generated based on a request of a personal data management provider to a distributed ledger.

According to a twelfth aspect, the disclosure provides a method for providing a communication network node for providing a mobility service provider, the method comprising:

accepting an anonymous identifier of a user for booking a journey with the mobility service provider, wherein the anonymous identifier is generated for providing an anonymous identification of the user of a mobility management provider to the mobility service provider, wherein the anonymous identifier is generated based on a request of a personal data management provider to a distributed ledger.

According to a thirteenth aspect, the disclosure provides a method for a communication network, comprising:

generating an anonymous identifier for providing an anonymous identification of a user of a mobility management provider to a mobility service provider, wherein the anonymous identifier is generated based on a request of a personal data management provider to the distributed ledger.

According to a fourteenth aspect, the disclosure provides a method for a communication network, comprising:

selecting a journey route for a user to reach a destination, wherein the user uses an anonymous identifier for providing an anonymous identification of a user of a mobility management provider to a mobility service provider, wherein the anonymous identifier is generated based on a request of a personal data management provider to the distributed ledger.

According to a fifteenth aspect, the disclosure provides a method for a communication network, comprising:

issuing a journey ticket based on a credential of a user, wherein the credential is based on an anonymous identifier for providing an anonymous identification of the user of a mobility management provider to a mobility service provider, wherein the anonymous identifier is generated based on a request of a personal data management provider to the distributed ledger.

According to a sixteenth aspect, the disclosure provides a method for a communication network, comprising:

verifying a journey ticket based on a credential of a user, wherein the credential is based on an anonymous identifier for providing an anonymous identification of the user of a mobility management provider to a mobility service provider, wherein the anonymous identifier is generated based on a request of a personal data management provider to the distributed ledger.

According to a seventeenth aspect, the disclosure provides a method for a communication network, comprising:

finalizing a journey of a user based on a detection of a terminal device of a user, wherein the terminal device stores an anonymous identifier for providing an anonymous identification of the user of a mobility management provider to a mobility service provider, wherein the anonymous identifier is generated based on a request of a personal data management provider to the distributed ledger.

According to an eighteenth aspect, the disclosure provides a method for a communication network, comprising:

sharing a revenue of a journey of a user using a journey ticket which is based on a credential based on an anonymous identifier for providing an anonymous identification of the user of a mobility management provider to a mobility service provider, wherein the anonymous identifier is generated based on a request of a personal data management provider to the distributed ledger.

Further aspects are set forth in the dependent claims, the following description and the drawings.

BRIEF DESCRIPTION OF THE DRAWINGS

Embodiments are explained by way of example with respect to the accompanying drawings, in which:

FIG. 1 depicts a basic architecture of a system (communication network) according to the present disclosure;

DETAILED DESCRIPTION OF EMBODIMENTS

Figure 1:
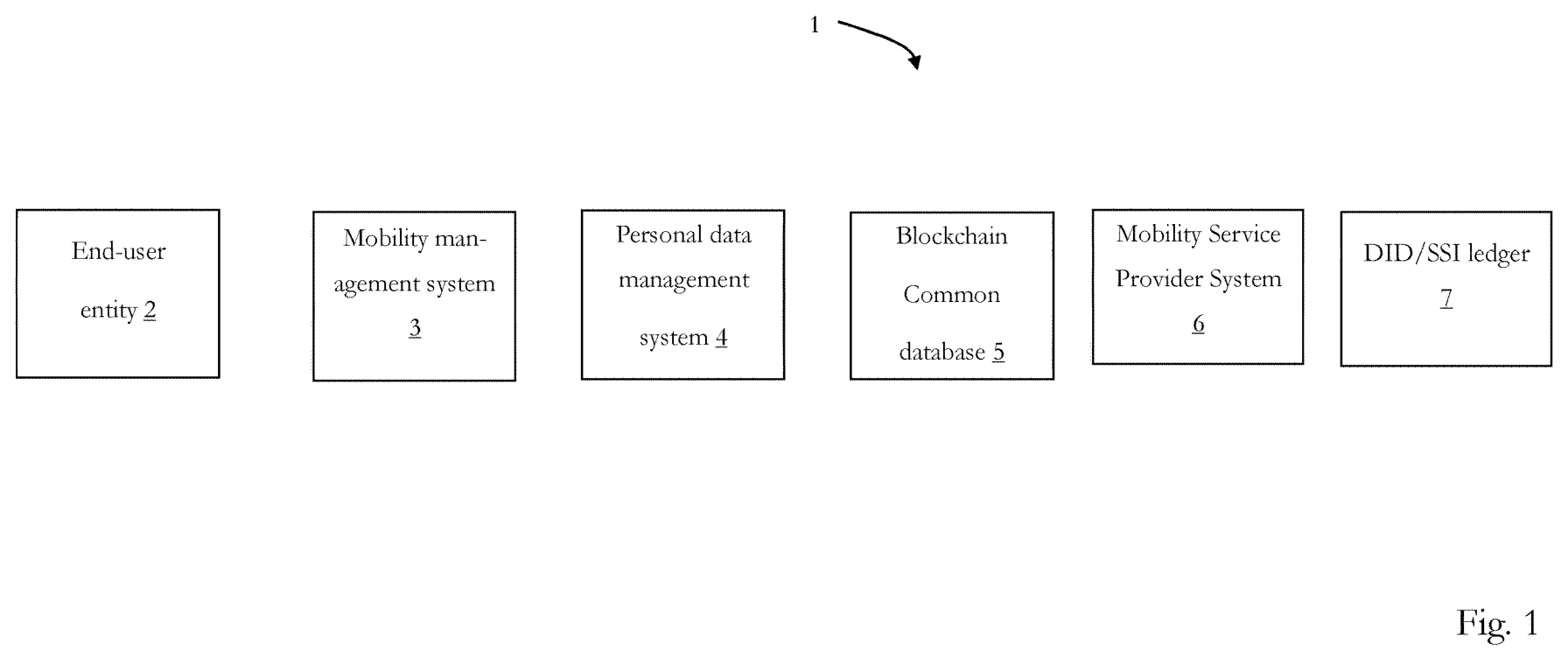
Figure 2:
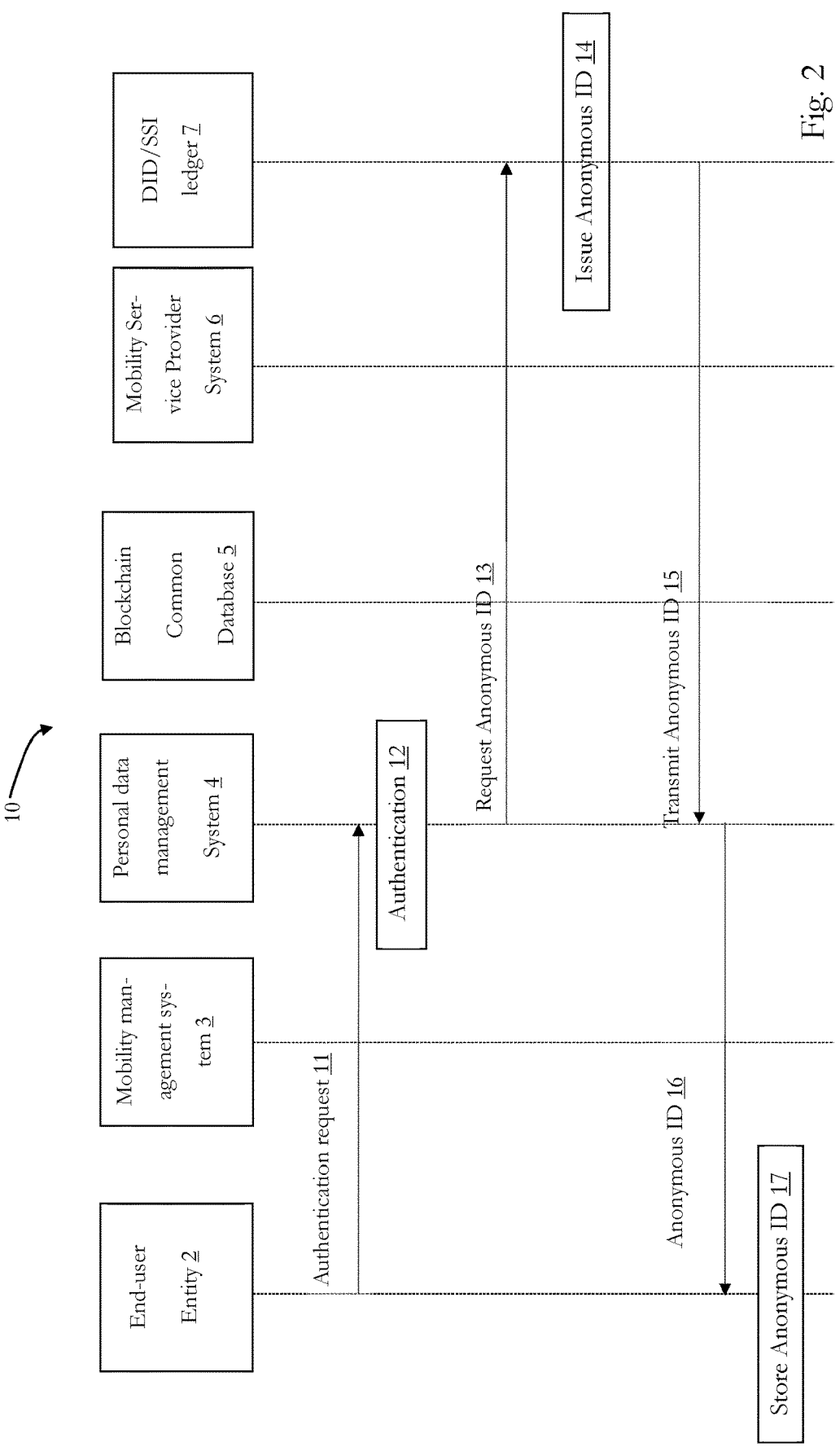
FIG. 2 depicts an embodiment of a method for issuing an anonymous identifier according to the present disclosure.

Before a detailed description of the embodiments starting with FIG. 1 is given, general explanations are made.

As mentioned in the outset, mobility as a service (MaaS) is generally known. A mobility service is typically provided by one single mobility service provider. However, it has been recognized that it is desirable to increase flexibility in mobility service by distributing mobility service over multiple ledgers.

It has further been recognized that it is desirable to protect a privacy and a security of a passenger (end-user) intending to use a mobility service, which may be achieved with decentralized identifiers (DID) and self-sovereign identity (SSI) which may increase a security, e.g. for personal data in such a roaming service.

A decentralized identifier may fulfill requirements of a user control of a digital ID, privacy, personal data management, no vendor lock-in, and the like.

Furthermore, a decentralized identifier may enable to provide a mobility service across countries of different mobility service providers.

It has further been recognized that MaaS may be implemented based on blockchain technology, for example. However, when requiring mobility service from different service providers (or transport operators), the user may need to provide his or her credential (e.g. his DID, ticket, etc.) to each of the service provider, i.e. he needs to be identified at each service provider (or transport operator) and each transport operator needs to check the validity of the credential, such that the user may need to lay open private documents to a multitude of different entities (i.e. service providers/transport operators), while at the same time, the user's journey is checked, tracked, and recorded in the distributed ledger.

Hence, it has been recognized that it is desirable to provide a system architecture in which the user's privacy is protected.

In the following, some terminology definitions are given, which may be applied in some embodiments (without limiting the present disclosure to the definitions given in the following. The definitions are only examples which are provided for enhancing the understanding of the present disclosure and which are only given, since the technology fields of MaaS and distributed ledgers are highly dynamical and definitions may change in the future.).

The term "distributed ledger" may be known from Wikipedia, which defines: "distributed ledger (also called a shared ledger, or distributed ledger technology, DLT) is a consensus of replicated, shared, and synchronized digital data geographically spread across multiple sites, countries, or institutions. There is no central administrator or centralized data storage."

The technology of a distributed ledger and of a special example of it, namely of a blockchain, will also be discussed further below. More generally, the term distributed ledger is used as a type of database shared digitally recorded data with multiple nodes of a network. It may be comprised of peer to peer network. The digitally recorded data may include a kind of information to prove its consistency from the previously recorded data on the same database.

Distributed ledgers can be public and can be accessible by anyone, but, in principle, they can also be non-public and only users having a permission may have access to them, wherein a group of entities, nodes, persons, operators, providers or the like which have the permission may also referred to as "consortium", as will also be explained further below. It is also possible to differentiate the access permission to data on a ledger from each layered users.

Distributed ledgers can use mechanisms, which are known, for example, from the blockchain technology as used for bitcoin. Such mechanisms include a discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

In a distributed ledger or blockchain, a confirmation process to make a consensus about data renewal on a blockchain in attending nodes, called a mining process, may achieve irreversibility of the sequence of transactions recorded on the blockchain by including previous recorded data in the confirming data. Such mining process implements a distributed timestamp server for a new block of transactions. In bitcoin (and, thus, in some embodiments) the mining process is based on the SHA-256 hash function. Nodes of the blockchain that participate in the mining process search for a hash output with predefined properties while the input of the hash function depends on the current blocks of the blockchain and the new block of transactions to be added to the blockchain.

Proof-of-work computations based on hash functions may not be useful in themselves except that they are required to implement the irreversibility of the distributed ledger.

Moreover, generally, it is known to use a blockchain for storing a variety of data. For instance, images, videos, measurements, and text files can be recorded on the blockchain in the form of a transaction.

The term "Mobility as a service (MaaS)", is also exemplarily known from Wikipedia, which defines: "Mobility-as-a-Service (MaaS) describes a shift away from personally-owned modes of transportation and towards mobility solutions that are consumed as a service. This is enabled by combining transportation services from public and private transportation providers through a unified gateway that creates and manages the trip, which users can pay for with a single account. Users can pay per trip or a monthly fee for a limited distance. The key concept behind MaaS is to offer travelers mobility solutions based on their travel needs."

The term "mobility service provider" may be a catch-all name of any type of service provider MaaS. In some embodiments, it is typically a transport organization, such as railway companies, bus/coach, tram and taxi, car sharing, ride sharing, bike sharing and so on. Some of the mobility service providers may not provide the actual transport means, but may provide only a booking/arrangement, comparable to a travel agency or online booking site or the like. To a mobility service provider (or MaaS provider), it may also be referred to as "transport operator", in some embodiments.

The term "passenger" may refer to a person who has a service contract with a home mobility service provider or which is a costumer of a home mobility service provider (defined below).

The term "home mobility service provider" may refer to a mobility service provider being located or operating in a fixed area (e.g. country, city), and may be a mobility service provider with which a passenger may have a contract, e.g. for a pass, tickets, subscriptions, and the like. The passenger may be multiple service providers, as well, in some embodiments.

A "mobility service provider" (also referred to as "MaaS service provider") may be a superordinate term for the terms "home mobility service provider" and "roaming mobility service provider" (which are defined below), and may refer to an operator, a society, a company, and the like, which offers a mobility service in a specific mobility service area (e.g. a town, a country, a region, air route, water route).

The term "home mobility service provider" may refer to a mobility service provider being located or operating in a fixed area (e.g. country, city), and may be a mobility service provider with which a passenger may have a contract, e.g. for a pass, tickets, subscriptions, and the like. The passenger may be multiple service providers, as well, in some embodiments.

The term "roaming mobility service provider" may refer to any other mobility service provider with which a passenger has no direct contract, subscription, and the like. Thus, the passenger may use a mobility service of a roaming mobility service provider, but processes of purchasing a pass, a ticket, or using mobility service of the roaming mobility service provider may be processed via the home mobility service provider.

The term "end-user" may refer to a passenger who intends to use a roaming mobility service provider. The term "end-user" may also refer to a terminal device of a passenger (e.g. smart phone).

The term "user agent" may refer to a software, an application, and the like, being executed on a terminal device (or user equipment) of a passenger, which is configured to handle a DID (see below), a credential (see below), and the like. For example, an MaaS application (e.g. from a mobility service provider) may function as a user agent.

A decentralized identifier (DID) may be understood according to the definition of the World Wide Web Consortium (W3C) as to be defined as a global unique ID. A DID may provide a decentralized public key infrastructure (DPKI) and may be used for self-sovereign identity (SSI), which may not depend on a centralized authority, for example.

A decentralized identifier (DID) resolver may refer to a server (or any other information system) which retrieves a DID document of response to a verification via a DID (see below), and the like.

A DID wallet may refer to an application, for example, which can store DID based credentials.

A credential may refer to an evidence of status, rights, membership, and the like, endorsed by an issuer, an MaaS provider, and the like. For example, a user may be able to proof (e.g. to a roaming mobility service provider) an Maas subscription membership (e.g. of a home mobility service provider) with a credential.

In some embodiments, the term "public-key cryptography" is understood as defined also in Wikipedia (https://en.wikipedia.org/wiki/Public-key_cryptography): "Public-key cryptography, or asymmetric cryptography, is any cryptographic system that uses pairs of keys: public keys which may be disseminated widely, and private keys which are known only to the owner. This accomplishes two functions: authentication, where the public key verifies that a holder of the paired private key sent the message, and encryption, where only the paired private key holder can decrypt the message encrypted with the public key." Wherein, "Two of the best-known uses of public key cryptography are: Public key encryption, in which a message is encrypted with a recipient's public key. The message cannot be decrypted by anyone who does not possess the matching private key, who is thus presumed to be the owner of that key and the person associated with the public key. This is used in an attempt to ensure confidentiality.", and, "Digital signatures, in which a message is signed with the sender's private key and can be verified by anyone who has access to the sender's public key. This verification proves that the sender had access to the private key, and therefore is likely to be the person associated with the public key. This also ensures that the message has not been tampered with, as a signature is mathematically bound to the message it originally was made with, and verification will fail for practically any other message, no matter how similar to the original message."

The term "personal data" may be understood in some embodiments in the sense (see exemplary https://gdpr-info.eu/art-4-gdpr/): "(1) 'personal data' means any information relating to an identified or identifiable natural person ('data subject'); an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person;"

In some embodiments, the abbreviation AAA may refer to "Authentication, Authorization, and Accounting" in a computer network or in a network service, as it is generally known as a security framework for an information and communication technology (ICT).

Authentication may refer to a checking whether a user (or in the context of the present disclosure a passenger) is a legitimate user of the network, network service, or system. For example, an MaaS servicer (e.g. a mobility service provider, a transport operator) may check a user/passenger identification and a status of a service subscription when the user/passenger intends to use the MaaS service.

Authorization may refer to a checking which specific service (or services) an authenticated user/passenger is allowed to use. For example, an MaaS servicer may check a contract type, a service type, and the like, of the user and may determine the allowed service of the user/passenger. For example, the user/passenger may be allowed to use a train service, but not a taxi service, such that a use of a train may be permitted, whereas a use of a taxi may be denied.

Accounting may refer to a recording of the user's/passenger's behavior and/or his used service(s) (e.g. how long he uses a service, how often he uses a service, and the like). For example, a passenger if a passenger uses an MaaS service, such as a booking, a riding, and the like, a record of this may be stored.

Self-sovereign identity (SSI) may be defined in accordance given by W3C, namely as a lifetime portable digital identity that does not depend on any centralized authority, wherein SSI may refer to a class of identifiers which fulfills the following requirements: persistence, global resolvability, cryptographical verifiability, and decentralization.

Some embodiments pertain to a communication network node for providing a distributed ledger, including circuitry configured to: generate an anonymous identifier for providing an anonymous identification of a user of a mobility management provider to a mobility service provider, wherein the anonymous identifier is generated based on a request of the personal data management provider to the distributed ledger.

The communication network node may include a computer, a server, a terminal device, or the like. Moreover, multiple of such components (e.g. several servers, which may also be coupled to terminal devices, and the like) may be envisaged. Generally, functions may be provided by software in a cloud service, such that this communication network node is not a physical node in some embodiments. The communication network node may be virtualized and, e.g., provided by a software-based solution. For example, the software-based functions could be deployed in the commercial cloud service (public cloud), in on-premise cloud (private cloud), in Multi-access Edge Computing (MEC) in the telecom network operator, and the like.

For example, the mobility management provider may correspond to a home mobility service provider (or may be a different servicer; e.g. the mobility management provider may not be a transport operator at all and may only manage different transport operators, dependently or independently).

Hence, the mobility management provider may be an entity (e.g. a network node) at which the user files a request for using a transport operator, for example.

The mobility management provider may store or may have access to an identifier of the user, such as a DID (which may not be anonymous, such as a global unique DID).

The anonymous identifier may correspond to an identifier (ID/DID) which the personal data management provider may use as a credential for providing identification to mobility service providers.

The personal data management provider may correspond to a network node which may (e.g. as only entity) know the relation between the global unique DID and the anonymous DID. Hence, for every journey request, which the user makes at the mobility management provider, the mobility management provider passes the request together with the user's global unique DID to the personal data management provider, which may anonymize the request in that the global unique DID may be replaced with the anonymous DID.

Generally, the personal data management provider and the mobility management provider may be a same or different entities.

For example, a city may have different mobility service providers. The user may have a contract with one of them (e.g. a bus service provider) which may then serve as the mobility management provider. If the user wishes to use a mobility service of a different mobility service provider (e.g. taxi), the user may book a taxi via the mobility management provider, which may pass the booking to the personal data management provider which may then provide an identification of the user via his anonymous ID to the different mobility service provider (taxi provider).

A revenue may be shared, for example, via the mobility management provider, such that the user would not need to pay the different mobility service provider directly, thereby keeping the travel anonymous to the different mobility service provider.

The anonymous ID may be generated based on a request of the personal data management provider to the distributed ledger.

For example, the anonymous ID may be generated based on blockchain technology, as discussed herein, thereby fulfilling the requirements as set by W3C. Hence, the user may contract with the mobility management provider and the mobility management provider may then store the anonymous ID, such that the mobility management provider may issue transport requests at different mobility service providers for the user, thereby ensuring the user's anonymity.

FIG. 1 depicts a basic architecture of a system 1 (communication network) according to the present disclosure.

The system 1 includes a plurality of MaaS subsystems, such as an end-user entity 2 (e.g. a mobile/terminal device of a user), a mobility management system 2, a personal data management system (PDM) 3, a blockchain common database 4, a MaaS service provider system 5, and a DID ledger 6.

The end-user entity 2 may be configured to provide a user interface and a management of a mobility service to an end-user who has a contract with an MaaS servicer. The end-user entity 2 may include a smart phone application or a web service for the end-user, or the like.

Accordingly, some embodiments pertain to a terminal device including circuitry configured to: authenticate a user of the terminal device at a communication network node, such that the communication network node requests an anonymous identifier for providing an anonymous identification of the user to a mobility service provider, wherein the request is directed to a communication network node for providing a distributed ledger.

The end-user entity 2 (e.g. terminal device) may further provide at least one of the following functions, in some embodiments:

Sending a request of the end-user (including a destination) to an MaaS servicer.

Showing candidate routes, cost, journey time and so on from a start point to a destination point by the MaaS servicer.

Sending the selected result (i.e. the route which the user selected) to the MaaS servicer Receiving the navigation data for the selected route and providing guidance to the end user.

The end user can confirm the additional payment if needed (e.g. beyond allowance of MaaS service like using taxi, first class).

During the journey, tracking the current end-user position and sending events of the journey, such as passing through the station gate, ride/arrival at the railway/tram/bus (at any other destination or with any other predetermined vehicle) and arrival at an intermediate point.

Detecting the arrival at a destination and starting (initiating) a finalization process of the journey when the end-user arrives at the destination.

The mobility management system 3 may be configured for coordination/negotiation with multiple transport operators (e.g. bus, tram, subways, railways, taxi, bike sharing, etc.), such that multi-modal mobility services may be provided.

In some embodiments, the mobility management system 3 may provide at least one of the following functions:

Finding the route/transport system based on an end-user request and/or other conditions like preferable transport system. It may search the multiple candidate routes (if more than one route) and provides them to end-user.

Matching the demand/supply between transport operator and end-user, for example finding a vacant seat, the variable tariff, e.g. based on peak status, or the like.

Decision of route and transport based on end-user selection/consent and/or booking/arranging a seat with the transport operator (if reservation is required).

Generating support information for the end-user and provide it to end-user entity like the route guidance, the navigation data, etc.

Tracking the user events and current status of journey during the journey (generally speaking: predetermined (journey) events are tracked). For example, if the end-user passes a station gate (e.g. based on NFC), it is detected and the event of the journey is generated, or any other journey events, as discussed herein.

The revenue sharing calculation among/with transport operators/mobility service providers when the journey is finished.

Accordingly, some embodiments pertain to a communication network node for providing a mobility management provider, including circuitry configured to: provide candidate routes to a user based on a request of the user which is issued based on an anonymous identifier for providing an anonymous identification of the user to a mobility service provider, wherein the anonymous identifier is generated based on a request of a personal data management provider to the distributed ledger.

The personal data management (PDM) system 4 may be configured for MaaS subscriber data management. It may be responsible for at least one of the following functions:

Handling MaaS services subscription/contract.

User authentication and/or authorization of MaaS service.

Handling of global unique DID and anonymous DID. Note that only the PDM 4 may know the relation between the global unique ID and anonymous ID. Hence the PDM 4 may also request the issuing of the anonymous ID.

Storing payment information (e.g. credit card information) and handling payment if requested.

Storing the preferences of end-user's journey/transport system. For example, preferable/non-preferable transportation system, (first) class usage, special conditions of the user like wheel-chair use, or the like.

Storing historical information of the journey. Updating the historical information when the journey is finished. Historical information may include at least one of frequent destinations, frequent start points, transit points, or the like.

Since the personal data may be sensitive, the PDM 4 may only share personal data in response to an agreement of the user of may not share the personal data at all.

Accordingly, some embodiments pertain to communication network node including circuitry configured to: request an anonymous identifier for providing an anonymous identification of a user of a mobility management provider to a mobility service provider, wherein the request is directed to a communication network node for providing a distributed ledger.

The blockchain common database 5 may be configured for reading/writing the MaaS transactions to/from distributed ledger (blockchain). A transaction may be recorded when an MaaS event is occurred.

For example, at least one of the following may be recorded/stored/carried out:

Anonymous DID (end-user ID)

Time/date stamp of the journey and/or contract and/or journey event

MaaS subscription/contract type (monthly based subscription, one day ticket, pay as you go and the like)

Validation of ticket right (e-ticket) if one-time ticket

Location/event (start point, transit, intermediate destination, final destination, passing the gate, ride/arrive the train, exit the station)

The journey beyond MaaS allowance (e.g. additional charge)

Transport cost and transport operator (mobility service provider) for revenue share calculation Accordingly, some embodiments pertain to a communication network node for providing a distributed ledger, including circuitry configured to: store an anonymous identifier which is generate in a distributed ledger for providing an anonymous identification of a user of a mobility management provider to a mobility service provider, wherein the anonymous identifier is generated based on a request of a personal data management provider.

The mobility service provider system 6 may be configured for handling transport service operations in transport operators/MaaS servicers. The mobility service provider system 6 may further be configured for at least one of the following:

Accepting the anonymous DID.

Providing assistance information for end user's route selection. Finding the candidate route and timetable based on end user's input.

Booking the journey and issuing the ticket right (e-ticket) when end user selects the route.

Fare management. Calculating the fare of journey. Checking and recording the ride/arrival of transport system and pass the gate, validated e-ticket.

Recording a (journey) event during journey. For example, the transport operator detects the end-user passing the gate of railway station, such that the event is recorded in the common database.

Finalization of journey. When the journey is finished, a revenue sharing calculation is executed and recorded at the common blockchain database 5.

Accordingly, some embodiments pertain to a communication network node for providing a mobility service provider, including circuitry configured to: accept an anonymous identifier of a user for booking a journey with the mobility service provider, wherein the anonymous identifier is generated for providing an anonymous identification of the user of a mobility management provider to the mobility service provider, wherein the anonymous identifier is generated based on a request of a personal data management provider to a distributed ledger.

The DID/SSI ledger 7 may be configured for handling the DID issuance and verification of it requested by a third party.

DID/SSI ledger 7 may also be based on a blockchain for DID/SSI, but may be different from the common blockchain database 5. The DID/SSI ledger 7 may be responsible for at least one of the following:

Issuing of global unique DID for permanent use, and anonymous DID for temporary use.

Issuing of credential(s) (e.g. e-ticket, proof of MaaS subscription, proof of driving license, entry visa to a specific country, etc) with global unique DID or anonymous DID.

Verification of credential requested by third party. For example, a railway company may check the validity of e-ticket, a car sharing company may check conditions of a driving license, or the like.

Invalidation/revoking of credential. For example, the end-user may have used a one-time e-ticket, a date is expired, the user may have quitted an MaaS service, or any other predetermined event.

Accordingly, the DID/SSI ledger 7 may correspond to the distributed ledger which issues the anonymous DID, as discussed above.

Some embodiments pertain to corresponding methods which, when the methods are carried out, cause respective entities to function as the entities as discussed herein, e.g. as a terminal device, a communication network node, or the like.

For example, some embodiments pertain to a method for providing a communication network node for providing a distributed ledger, the method including: generating an anonymous identifier for providing an anonymous identification of a user of a mobility management provider to a mobility service provider, wherein the anonymous identifier is generated based on a request of a personal data management provider to the distributed ledger.

Some embodiments pertain to a method for providing a communication network node, the method including: requesting an anonymous identifier for providing an anonymous identification of a user of a mobility management provider to a mobility service provider, wherein the request is directed to a communication network node for providing a distributed ledger.

Some embodiments pertain to a method for operating a terminal device, the method including: authenticating a user of the terminal device at a communication network node, such that the communication network node requests an anonymous identifier for providing an anonymous identification of the user to a mobility service provider, wherein the request is directed to a communication network node for providing a distributed ledger.

Some embodiments pertain to a method for providing a communication network node for providing a mobility management provider, the method including: providing candidate routes to a user based on a request of the user which is issued based on an anonymous identifier for providing an anonymous identification of the user to a mobility service provider, wherein the anonymous identifier is generated based on a request of a personal data management provider to the distributed ledger.

Some embodiments pertain to a method for providing a communication network node for providing a distributed ledger, the method including: storing an anonymous identifier which is generate in a distributed ledger for providing an anonymous identification of a user of a mobility management provider to a mobility service provider, wherein the anonymous identifier is generated based on a request of a personal data management provider.

Some embodiments pertain to a method for providing a communication network node for providing a mobility service provider, the method including: accepting an anonymous identifier of a user for booking a journey with the mobility service provider, wherein the anonymous identifier is generated for providing an anonymous identification of the user of a mobility management provider to the mobility service provider, wherein the anonymous identifier is generated based on a request of a personal data management provider to a distributed ledger.

In the following, methods for communication networks according to the present disclosure are discussed. It should be noted that the methods may be carried out independently of each other, or may be combined, in some embodiments.

Referring to FIG. 2, an embodiment of the present disclosure of a method 10 for issuing an anonymous ID is discussed.

As discussed above, it may be desired to use the anonymous ID instead on the global unique ID since the global unique ID may be suitable to identify the end-user. Furthermore, if the global unique ID is written into a blockchain, it may be immutable and not easy to delete later As a prerequisite, which is not shown here, the user may already have a global unique DID.

At 11, based on the global unique DID, the end-user entity 1 sends an authentication request to the personal data management system 4. If the end-user has a MaaS service contract, the global unique DID is registered.

When the personal data management system 4 confirms the end-user's unique DID (i.e. authentication is successful at 12), it requests the anonymous DID from the DID/SSI ledger 7, at 13.

At 14, the DID/SSI ledger 7 issues the anonymous DID which is valid for a one-time journey (or valid during the specific period, e.g. one-day ticket).

At 15, the DID/SSI ledger 7 sends the anonymous DID to the personal data management system 4.

At 16, the personal data management system 4 sends the anonymous DID to the end-user entity 2 and the end-user entity 2 receives the anonymous DID and stores it in the DID wallet of end-user, at 17.

As indicated above, only the MaaS servicer (which is in this case the personal data management system 4) who has a contract with the end-user knows the relation between the global unique DID and the anonymous DID.

Other MaaS servicers and transport operators do not know the global unique ID. However, exceptions are possible, e.g. in the case the personal data information should be kept by the transport operator, such as an airplane ticket.

Accordingly, some embodiments pertain to a method for a communication network, including: generating an anonymous identifier for providing an anonymous identification of a user of a mobility management provider to a mobility service provider, wherein the anonymous identifier is generated based on a request of a personal data management provider to the distributed ledger.

Figure 3:
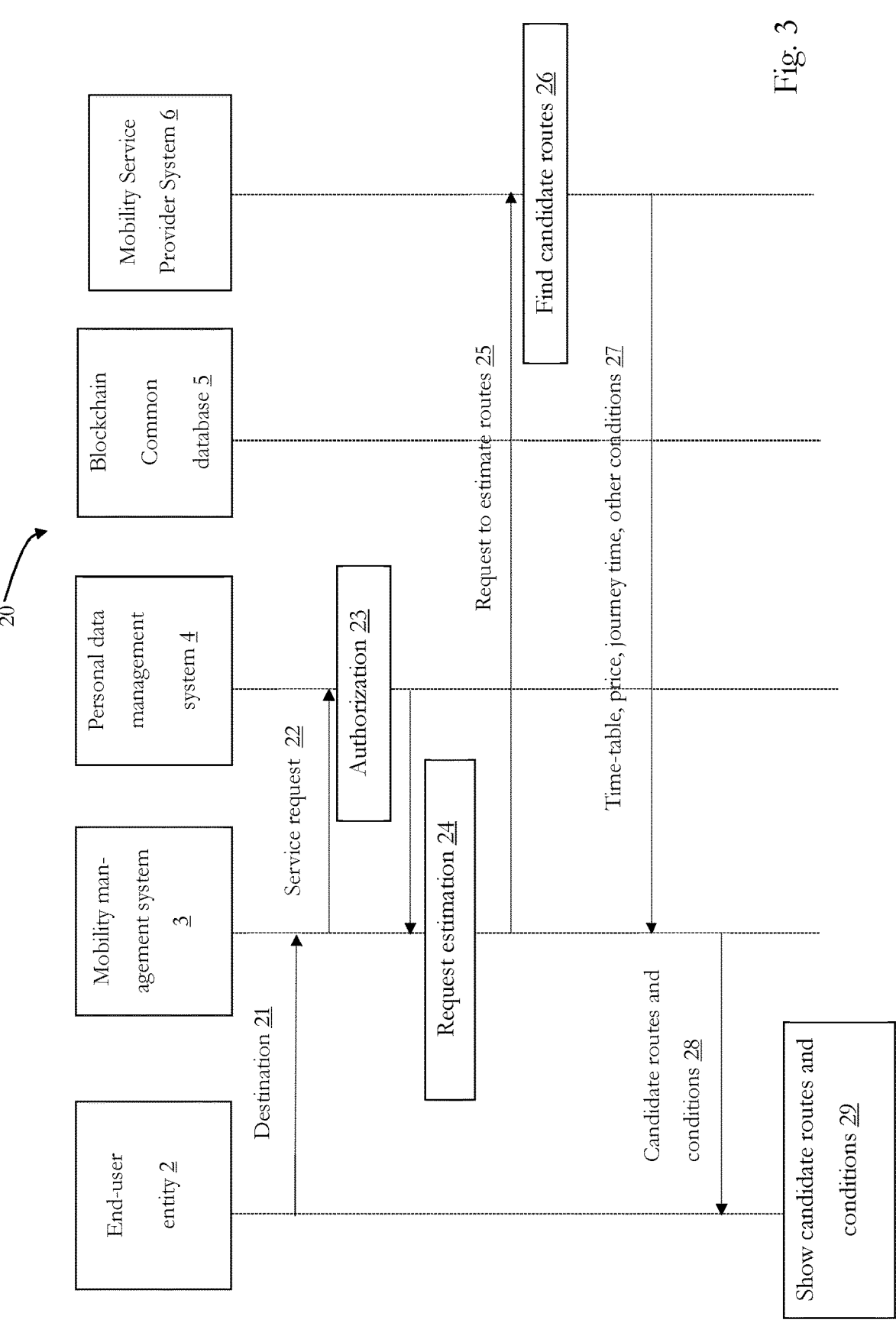
FIG. 3 depicts an embodiment of a method for selecting a journey route according to the present disclosure.

FIG. 3 depicts an embodiment of a method 20 for selecting a journey route according to the present disclosure.

In the case that multiple routes from a start to a destination are possible, the multiple routes (candidate routes) may be shown to the user. The end user may select a final route among the candidates and may get the e-ticket.

At 21, the end-user inputs the destination (and start point if it is different from the current location).

At 22, the mobility management system 3 requests the service and authorization of it at the PDM 4.

At 23, the personal data management system 4 authorizes the service, if it is within the allowance of the user's contract, for example. The PDM 4 may store the preference/history of previous journey and sends them back to mobility management system in addition to the authorization result.

At 24, the mobility management system 3 requests candidate routes, cost estimation, estimated arrival time and so on at the mobility service provider system 6, at 25. It is requested to multiple transport operators if there are multiple alternative routes/transport operators.

At 26, the mobility service provider system 6 finds the route and at 27 sends back the candidate routes and other journey information like price, journey time, etc. which may be useful for the end-user's decision.

At 28, the mobility management system 3 sends the candidate routes and conditions to end-user entity 2, which shows, at 29, the end user the candidate routes and conditions, such that the end-user can compare the candidate routes and conditions to select the final route and conditions.

Accordingly, some embodiments pertain to a method for a communication network, including: selecting a journey route for a user to reach a destination, wherein the user uses an anonymous identifier for providing an anonymous identification of a user of a mobility management provider to a mobility service provider, wherein the anonymous identifier is generated based on a request of a personal data management provider to the distributed ledger.

Figure 4:
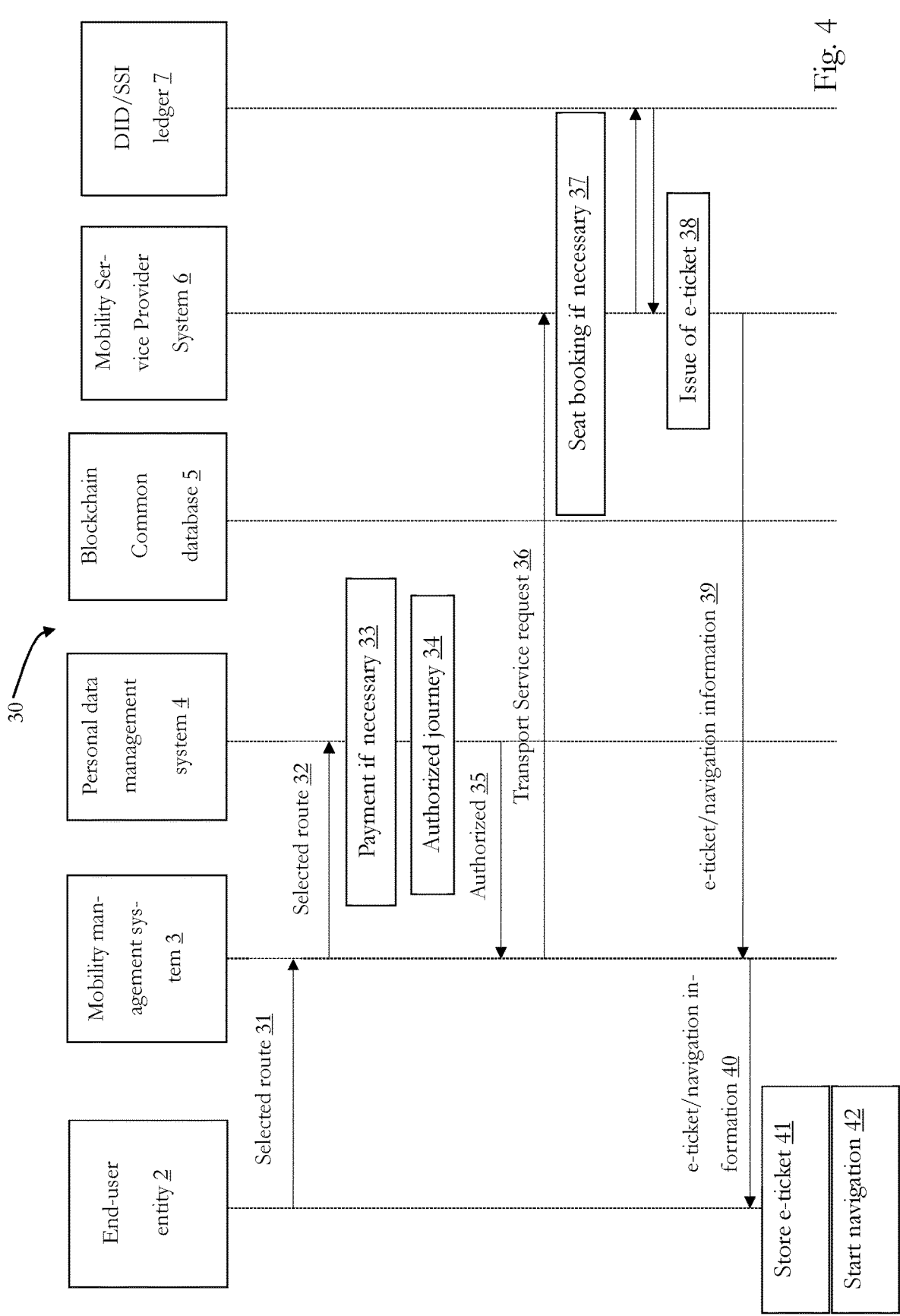
FIG. 4 depicts an embodiment of a method for issuing an e-ticket according to the present disclosure.

FIG. 4 depicts a method 30 for issuing an e-ticket (journey ticket) according to the present disclosure. The e-ticket is generally issued, in some embodiments, based on the credential of the user for proving an MaaS subscription.

At 31, the end-user selects a route among the candidate routes and the end-user entity 2 transmits the selected route to the mobility management system 3.

At 32, the mobility management system 3 checks whether the selected route is within the allowance of the user's contract. If additional payment is required, the end-user is requested, via the PDM 4 for his consent of the additional payment, at 33.

If all conditions are clear, the PDM 4 authorizes the selected journey, at 34, and transmits the authorization, at 35, to the mobility management system 3.

At 36, the mobility management system 3 (in this embodiment a MaaS servicer) requests a transport (mobility) service at the mobility service provider system 6 (transport operator or other MaaS servicer, as discussed herein).

At 37, the mobility service provider system 6 books a seat, if necessary and/or reserves a rental car, if necessary, and so on, if reservation in advance is required.

In order to do so, the mobility service provider system 6 requests a credential of an e-ticket at the DID/SSI ledger 7 and the DID/SSI ledger 7 sends back the credential.

Based on the credential, the mobility service provider system 6 issues the e-ticket, at 38, and prepares navigation/assistance information for the end-user of the journey, which is transmitted to the mobility management system 3, at 39.

At 40, the end-user entity 2 receives e-ticket and the navigation/assistance information from the mobility management system 3 and stores it, such that the journey can be started, at 41, and the navigation can be started at 42.

Accordingly, some embodiments pertain to a method for a communication network, including: issue a journey ticket based on a credential of a user, wherein the credential is based on an anonymous identifier for providing an anonymous identification of the user of a mobility management provider to a mobility service provider, wherein the anonymous identifier is generated based on a request of a personal data management provider to the distributed ledger.

Figure 5:
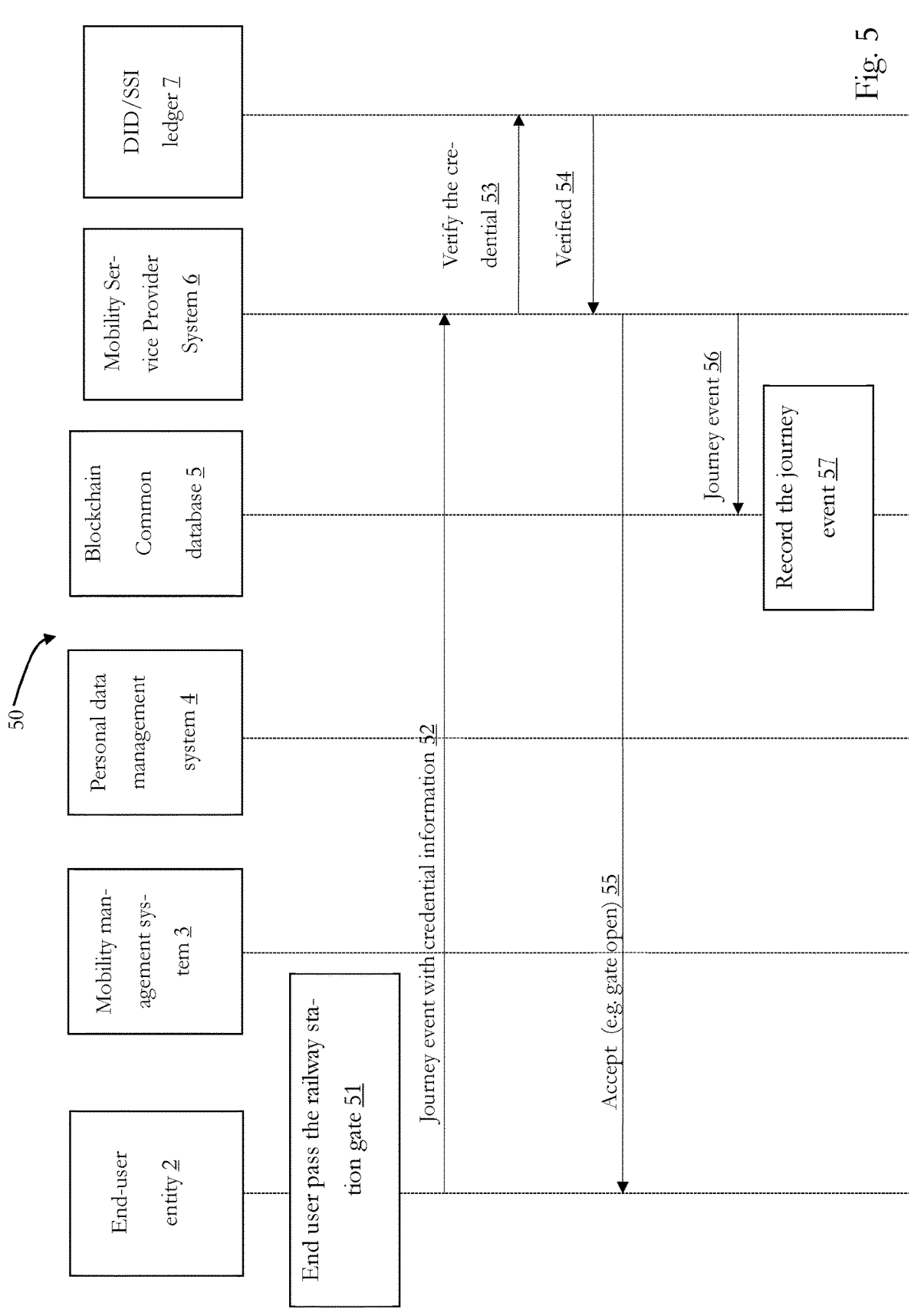
FIG. 5 depicts an embodiment of a method for verifying the e-ticket according to the present disclosure.

FIG. 5 depicts a method 50 for verifying the e-ticket according to the present disclosure.

Generally, a transport operator may need to verify the e-ticket during the journey, as discussed herein (e.g. checking a ticket validity during a train ride, or the like).

At 51, the end-user arrives at a check point (e.g. gate at railway station, boarding bridge at airport, bus station, etc.).

Based on the end-user's arrival, the end-user entity 2 prepares for showing the e-ticket. For example, the ticket may be shown based on a Barcode/QR code of the credential on a smartphone display (e.g. with activated near field communication (NFC)), or the like, without limiting the present disclosure in that regard. The credential information is transmitted from the end-user entity 2 to the mobility service provider system 6, at 52.

At 53, the mobility service provider system 6, i.e. the transport operator, requests to verify the credential (e-ticket) at the DID/SSI ledger 7.

If the credential is valid and thus verified at 54, the transport operator allows to proceed the journey (e.g. gate open), at 55.

At 56, the transport operator (mobility service provider) writes the journey event to the blockchain common database 5, such that the journey event is recorded in the blockchain common database 5. Note that the transport operator uses the anonymous DID for protecting personal data of the end-user.

Accordingly, some embodiments pertain to a method for a communication network, including: verifying a journey ticket based on a credential of a user, wherein the credential is based on an anonymous identifier for providing an anonymous identification of the user of a mobility management provider to a mobility service provider, wherein the anonymous identifier is generated based on a request of a personal data management provider to the distributed ledger.

If the checkpoint is the final destination, the finalization of the journey is proceeded to, as will be discussed under reference of FIG. 6.

Figure 6:
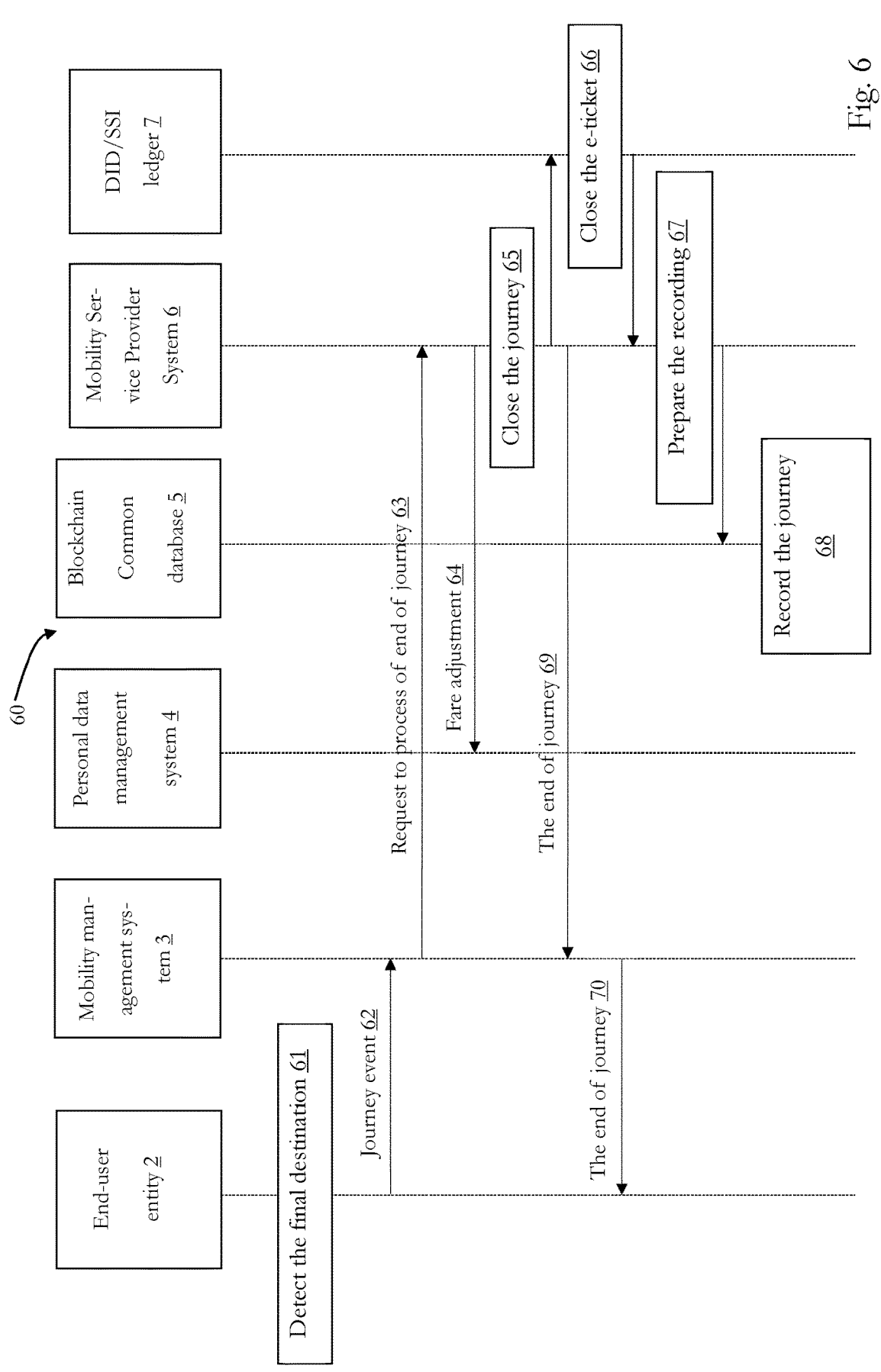
FIG. 6 depicts an embodiment of a method for finalizing the journey according to the present disclosure.

Hence, FIG. 6 depicts a method 60 for finalizing the journey according to the present disclosure.

When the end-user arrives at the final destination (e.g. the gate of railway station, geo-fencing detection in the destination area), which is detected at 61, the end-user entity 2 sends the end of the journey event to the mobility management system 3, at 62. The mobility service provider system 6 may detect the end of the journey directly, if the transport operator knows the arrival (e.g. air travel), in some embodiments, such that in this case the end-user entity does not need to detect the end of the journey and a corresponding method may start at 64, for example.

At 63, the mobility management system sends a request to process the end of the journey to the mobility service provider system 6.

At 64, the mobility service provider system 6 adjusts additional payment or refund of travel fares with the PDM 4 and starts closing the journey at 65. Hence, the mobility service provider system 6 issues a closing of the e-ticket at the DID/SSI ledger 7 by notifying the DID/SSI ledger 7, at 66.

Moreover, a recording of the journey, based on the closing of the e-ticket, is prepared in the mobility service provider system 6, at 67, such that the journey is recorded in the blockchain common database 5, at 68.

At 69, the mobility service provider system 6 sends a notification about the end of the journey to the mobility management system 3, which is transmitted to the end-user entity 2, at 70.

Accordingly, some embodiments pertain to a method for a communication network, including: finalizing a journey of a user based on a detection of a terminal device of a user, wherein the terminal device stores an anonymous identifier for providing an anonymous identification of the user of a mobility management provider to a mobility service provider, wherein the anonymous identifier is generated based on a request of a personal data management provider to the distributed ledger.

Since a transport operator does not have the global unique ID of the user, but only the anonymous ID, the transport operator may not be able to bill the end-user directly.

Figure 7:
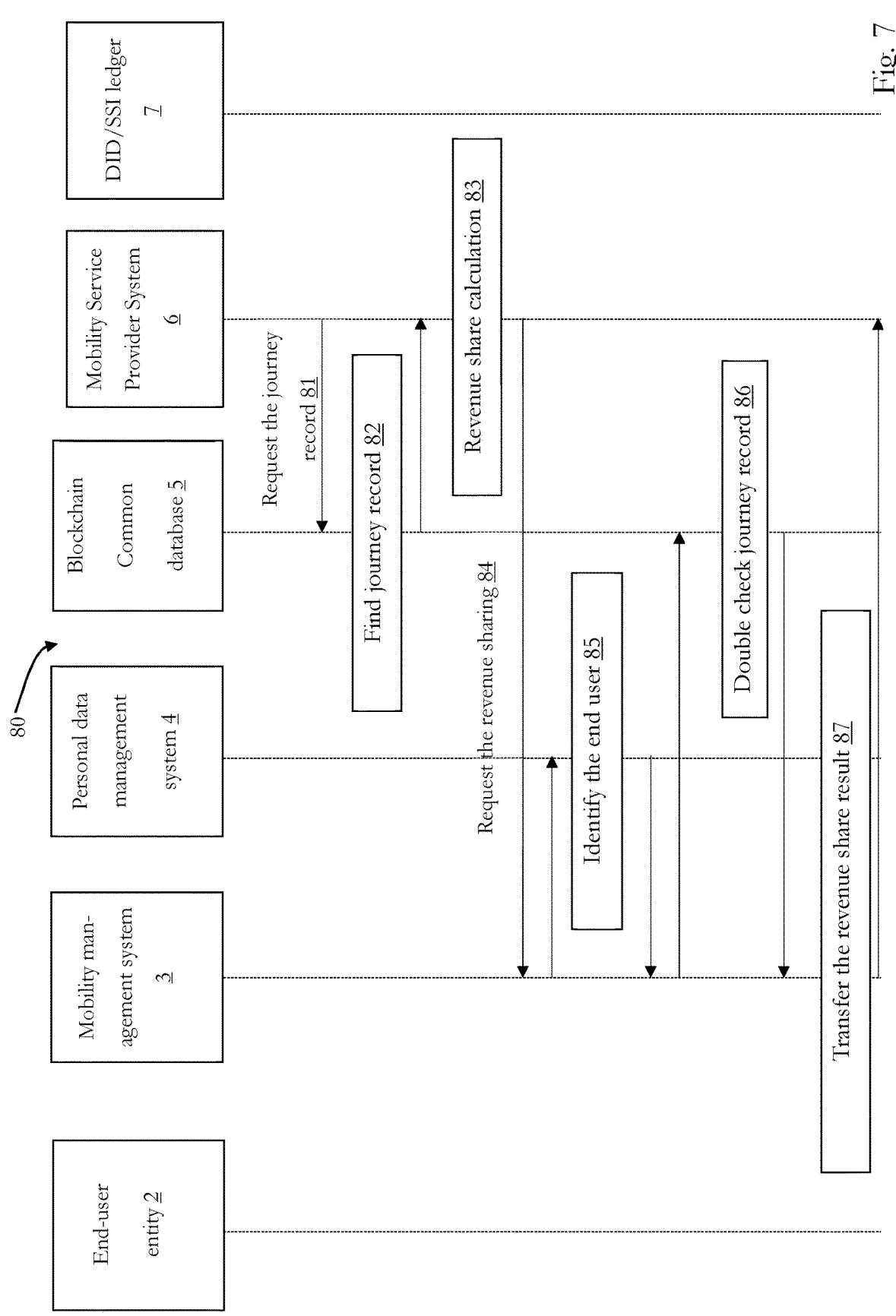
FIG. 7 depicts an embodiment of a method for sharing a revenue between the different entities according to the present disclosure.

Hence, FIG. 7 depicts a method 80 for sharing a revenue between the different entities according to the present disclosure.

At 81, the mobility service provider system 6 (transport operator) requests the record of the journey with the anonymous ID at the common blockchain database 5.

At 82, the common blockchain database 5 finds the record of the journey and provides the information which is needed for revenue sharing to the mobility service provider system 6. Note that personal data information should not be included in it, in some embodiments.

At 83, the mobility service provider system 6 calculates (determines) the amount of revenue to be shared with the mobility management system 3 and requests the revenue sharing at the mobility management system 3, at 84, with the anonymous DID.

The mobility management system 3 identifies/confirms the end-user at the personal data management system 4 (which knows the relation between the unique DID and the anonymous DID), at 85.

The mobility management system 3 may double check the revenue share amount at the common block chain database, at 86.

At 87, the mobility management system 3 transfers the amount of revenue share to the requested transport operator.

Accordingly, some embodiments pertain to a method for a communication network, including: sharing a revenue of a journey of a user using a journey ticket which is based on a credential based on an anonymous identifier for providing an anonymous identification of the user of a mobility management provider to a mobility service provider, wherein the anonymous identifier is generated based on a request of a personal data management provider to the distributed ledger.

In the following a blockchain and its general data structure will be explained under reference of FIG. 8. In this embodiment of a blockchain, features are a network/topology, a consensus algorithm a Hash function, participant authentication, a scalability/block structures and performance.

Figure 8:
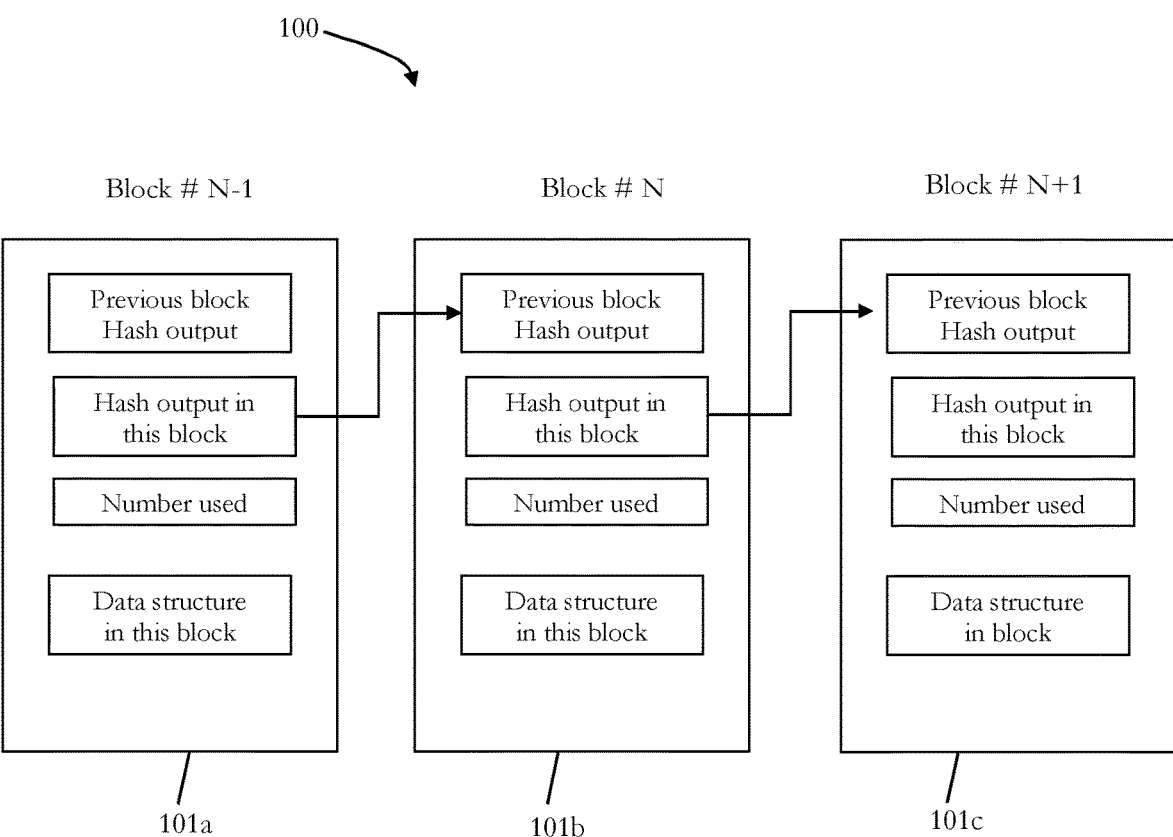
FIG. 8 depicts a blockchain and its general data structure.

FIG. 8 illustrates a general structure of a blockchain 100. The blockchain 100 includes a chain of multiple data blocks 101*a*, 101*b* and 101*c*, wherein the block 101*b* is a current block (Block #N), the block 101*a* is a previous block (Block #N−1) and the block 101*c* is a future or successor block (Block #N+1). Each block includes a hash function result of a previous block, a main data structure, an input value for hash function and hash function result of the current block, wherein the hash function result of current block (101*b*) is always used as input to the next block (101*c*).

Moreover, each block includes a "Number used once", which is a one-shot random number for a secure blockchain processing, and which can prevent replay attack. For instance, if an attacker copies the previous transmitted data and reuses the copied data again for spoofing, the receiver is able to detect the spoofing communication because the next data must be used with a different "number used once". This random number is sometimes referred to as "nonce" in cryptocurrency.

Additionally, the time stamp may be inserted in each of the blocks 101*a*, 101*b* and 101*c*. The blockchain 100 is an example of a distributed ledger, which may be used, for example, for providing MaaS in some embodiments.

Figure 9:
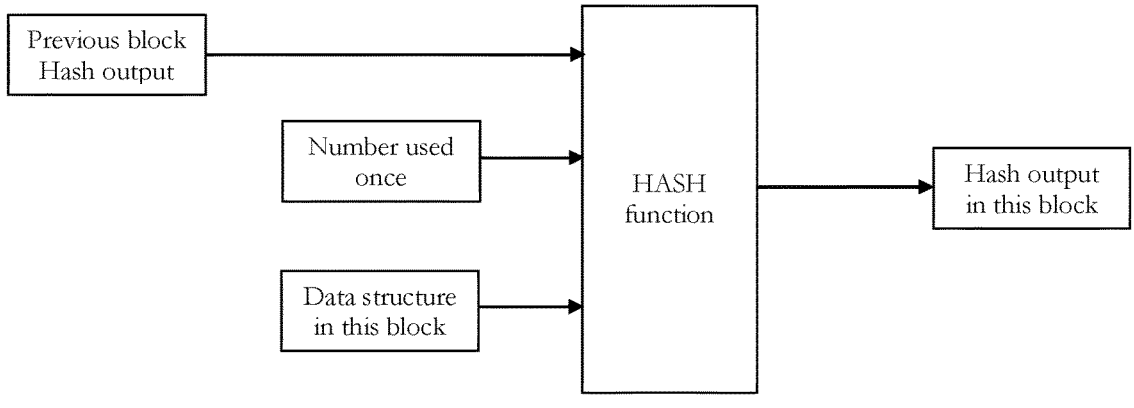
FIG. 9 illustrates an input and output of a hash function.

FIG. 9 illustrates the input and output of a hash function, which is used, for example, for the blockchain 100 of FIG. 8.

Generally, a hash function is any function that can be used to map input data to output data with a specific algorithm. The size of input data can be large and various, contrarily the output of data could be compact and can have a fixed size. A known (and famous) algorithm which is used for hashing in some blockchain embodiments is the Secure Hash Algorithm (SHA) designed by the United States National Security Agency (e.g. SHA-2, SHA-256).

The input for the hash function are a previous hash output, the number used once and the main body of data in the current block (e.g. block 101*b* in FIG. 8). The output of the hash function is a unique value response to the input values. If someone tries to tamper the main body of data, the output of hash function cannot be consistent.

Embodiments of a distributed ledger (blockchain) in this disclosure may implement a consensus protocol or algorithm. For instance, in some embodiments, the Byzantine Fault Tolerance (BFT) is used for the consensus protocol, which is resilient to spoofing of database and fault of hardware.

A well-known consensus algorithm, which is implemented in some embodiment, is the so-called Practical Byzantine Fault Tolerance (PBFT).

In some embodiments, a permission blockchain is used and the relatively small number of permissioned blockchain nodes are in charge of consensus (validation of block).

Figure 10:
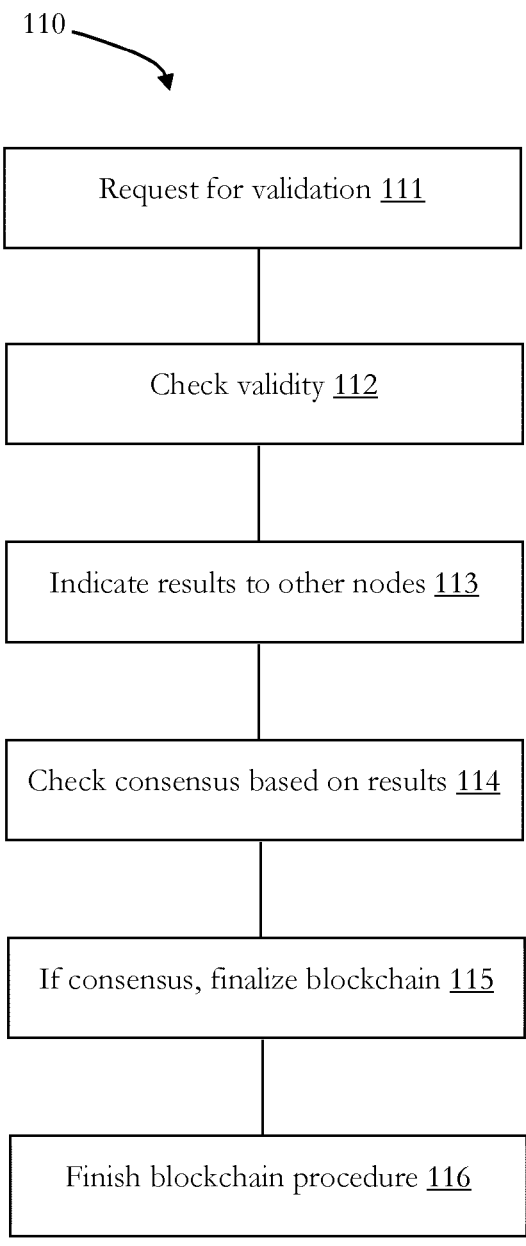
FIG. 10 exemplarily illustrates the process PBFT.

FIG. 10 exemplary illustrates a process 110 of PBFT.

A leader node (it also called non-validating peer) requests at 111 other nodes to validate the blockchain. At 112, each requested node (validate peer) checks the validity of the blockchain with a hash function and indicates its result to other nodes at 113. At 114, a node receives the validity results from multiple other peers and checks the consensus of the blockchain, if it receives more valid results than a pre-defined criteria. If there is a consensus, at 115, the node writes/finalizes the blockchain. A leader peer checks the overall progress of the validity check in other nodes and finishes at 116 the blockchain procedure.

For resilience, the total number of nodes is more than 3f+1 in some embodiments, wherein f is the number of allowed failure nodes. For example, f=1, there is a total 4 nodes; if f=3, there is a total of 10 nodes, etc.

In some embodiments, PBFT is with permission blockchains for mobility service blockchains, as discussed herein, providing at least partially the following features:

With respect to security, the PBFT provides in some embodiments a little risk of 51% attack, which is common for cryptocurrency because permission the peer which is in charge of consensus must be trusted. With respect to privacy, the end user cannot access the whole blockchain because only mobility service providers handle it at a (peer) node (due to the permission based blockchain and end users may not have the permission to access the blockchain). With respect to performance, the processing time for consensus is very short in some embodiments due to a small number of peers having a high performance. With respect to flexibility, the block size and format of blockchains can be flexible compared to public blockchains in some embodiments.

Figure 11:
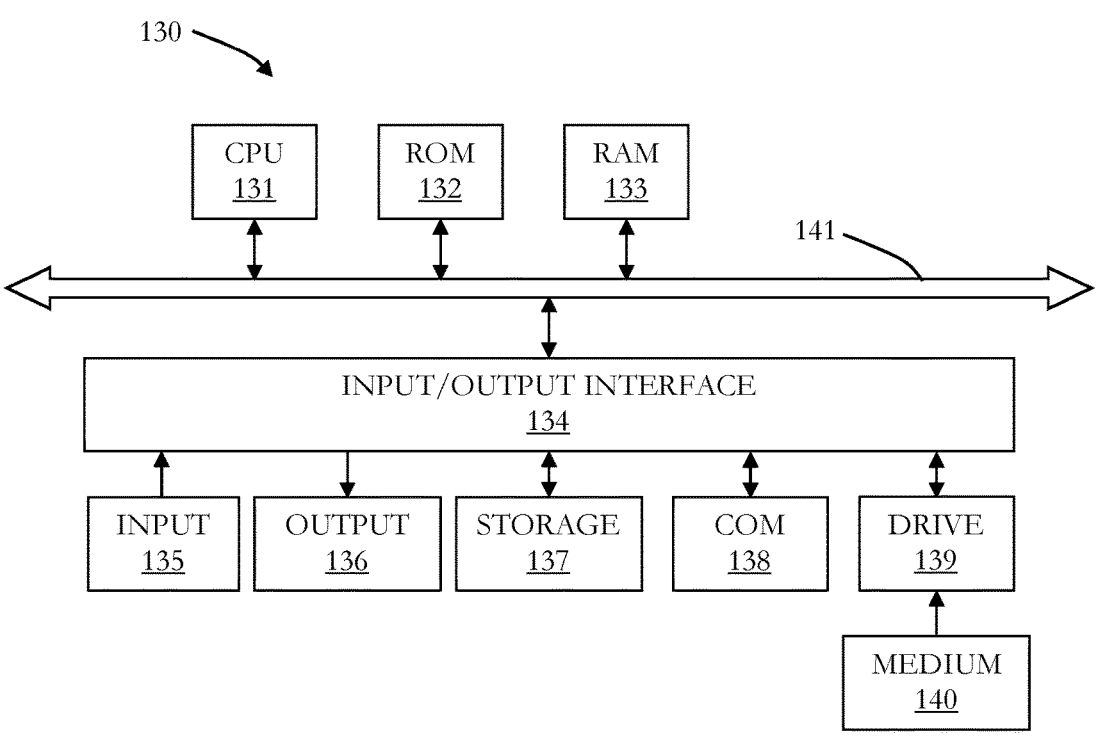
FIG. 11 depicts an embodiment of a general purpose computer.

In the following, an embodiment of a general purpose computer 130 is described under reference of FIG. 11. The computer 130 can be implemented such that it can basically function as any type of network equipment, e.g. a network node, an identity hub, a part of a decentralized database, a base station or new radio base station, transmission and reception point, or communication device, such as user equipment, (end) terminal device or the like. The computer has components 131 to 141, which can form a circuitry, such as any one of the circuitries of the network equipments and communication devices, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment (end terminal).

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

Figure 12:
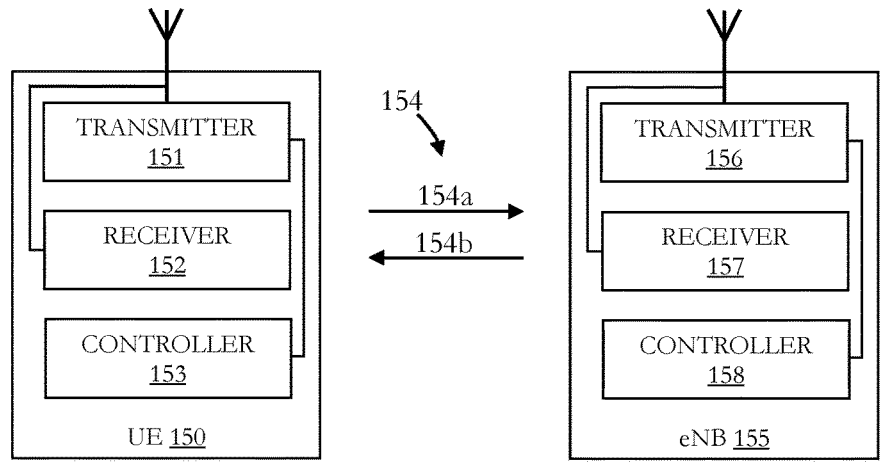
FIG. 12 depicts an embodiment of a user equipment and of an electronic network node.

An embodiment of a user equipment UE 150 and an eNB 155 (or NR eNB/gNB) and a communications path 154 between the UE 150 and the eNB 155, which are used for implementing embodiments of the present disclosure, is discussed under reference of FIG. 12. The UE 150 is an example of a communication device (or end-user entity) and the eNB is an example of a base station (e.g. a network node), without limiting the present disclosure in that regard.

The UE 150 has a transmitter 151, a receiver 152 and a controller 153, wherein, generally, the technical functionality of the transmitter 151, the receiver 152 and the controller 153 are known to the skilled person, and, thus, a more detailed description of them is omitted.

The eNB 155 has a transmitter 156, a receiver 157 and a controller 158, wherein also here, generally, the functionality of the transmitter 156, the receiver 157 and the controller 158 are known to the skilled person, and, thus, a more detailed description of them is omitted.

The communication path 154 has an uplink path 154a, which is from the UE 150 to the eNB 155, and a downlink path 154b, which is from the eNB 155 to the UE 150.

During operation, the controller 153 of the UE 150 controls the reception of downlink signals over the downlink path 154b at the receiver 152 and the controller 153 controls the transmission of uplink signals over the uplink path 154a via the transmitter 151.

Similarly, during operation, the controller 158 of the eNB 155 controls the transmission of downlink signals over the downlink path 154b over the transmitter 156 and the controller 158 controls the reception of uplink signals over the uplink path 154a at the receiver 157.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding. For example the ordering of 22 and 24 in the embodiment of FIG. 3 may be exchanged. Also, the ordering of 33 and 34 in the embodiment of FIG. 4 may be exchanged. Further, also the ordering of 55 and 56 in the embodiment of FIG. 5 may be exchanged. Other changes of the ordering of method steps may be apparent to the skilled person.

Please note that the division of the UE 150 or the eNB 155 into units 151 to 158 is only made for illustration purposes and that the present disclosure is not limited to any specific division of functions in specific units. For instance, the control UE 150 or the eNB 155 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A communication network node for providing a distributed ledger, comprising circuitry configured to:
    generate an anonymous identifier for providing an anonymous identification of a user of a mobility management provider to a mobility service provider, wherein the anonymous identifier is generated based on a request of a personal data management provider to the distributed ledger.

(2) The communication network node of (1), wherein the anonymous identifier is used temporary.

(3) The communication network node of (1) or (2), the circuitry being further configured to:
    issue a global identifier for permanent use.

(4) The communication network node of anyone of (1) to (3), the circuitry being further configured to:
    issue a credential for the user based on the anonymous ID.

(5) The communication network node of (4), the circuitry being further configured to:
    verify the credential based on a request of the mobility service provider.

(6) The communication network node of (5), wherein the request is based on at least one of the following: a validity of a ticket and a condition of a driving license.

(7) The communication network node of anyone of (4) to (6), the circuitry being further configured to:
    revoke the credential based on a predetermined event.

(8) The communication network node of (7), wherein the predetermined event includes at least one of the following: expiry of a date, expiry of a ticket, end of a service contract.

(9) A method for providing a communication network node for providing a distributed ledger, the method comprising:

generating an anonymous identifier for providing an anonymous identification of a user of a mobility management provider to a mobility service provider, wherein the anonymous identifier is generated based on a request of a personal data management provider to the distributed ledger.

(10) The method of (9), wherein the anonymous identifier is used temporary.

(11) The method of (9) or (10), further comprising:

issuing a global identifier for permanent use.

(12) The method of anyone of (9) to (11), further comprising:

issuing a credential for the user based on the anonymous ID.

(13) The method of (12), further comprising:

verifying the credential based on a request of the mobility service provider.

(14) The method of (13), wherein the request is based on at least one of the following: a validity of a ticket and a condition of a driving license.

(15) The method of anyone of (12) to (14), further comprising:

revoking the credential based on a predetermined event.

(16) The method of (15), wherein the predetermined event includes at least one of the following: expiry of a date, expiry of a ticket, end of a service contract.

(17) A communication network node comprising circuitry configured to:

request an anonymous identifier for providing an anonymous identification of a user of a mobility management provider to a mobility service provider, wherein the request is directed to a communication network node for providing a distributed ledger.

(18) The communication network node of (17), the circuitry being further configured to:

handle a mobility service subscription or a mobility service contract of the user with the mobility management provider.

(19) The communication network node of (17) or (18), the circuitry being further configured to:

authenticate the user at at least one of the mobility service provider and the mobility management provider.

(20) The communication network node of anyone of (17) to (19), the circuitry being further configured to:

authorize the user at at least one of the mobility service provider and the mobility management provider.

(21) The communication network node of anyone of (17) to (20), the circuitry being further configured to:

handle the anonymous identifier and a global identifier, wherein the anonymous identifier is used temporarily and the global identifier is used permanently.

(22) The communication network node of (21), the circuitry being further configured to:

store a relationship between the anonymous identifier and the global identifier.

(23) The communication network node of anyone of (17) to (22), the circuitry being further configured to:

store payment information of the user.

(24) The communication network node of anyone of (17) to (23), the circuitry being further configured to:

handle a payment between the user and at least one of the mobility service provide and the mobility management provider.

(25) The communication network node of anyone of (17) to (24), the circuitry being further configured to:

store a preference of the user.

(26) The communication network node of (25), wherein the preference includes at least one of a preferable transport system, a class usage and a special condition of the user.

(27) The communication network node of anyone of (17) to (26), the circuitry being further configured to:

store historical journey information.

(28) The communication network node of (27), the circuitry being further configured to:

update historical journey information after a finishing of a journey of the user.

(29) A method for providing a communication network node, the method comprising:

requesting an anonymous identifier for providing an anonymous identification of a user of a mobility management provider to a mobility service provider, wherein the request is directed to a communication network node for providing a distributed ledger.

(30) The method of (29), the circuitry being further configured to:

handling a mobility service subscription or a mobility service contract of the user with the mobility management provider.

(31) The method of (29) or (30), further comprising:

authenticating the user at at least one of the mobility service provider and the mobility management provider.

(32) The method of anyone of (29) to (31), further comprising:

authorizing the user at at least one of the mobility service provider and the mobility management provider.

(33) The method of anyone of (29) to (32), further comprising:

handling the anonymous identifier and a global identifier, wherein the anonymous identifier is used temporarily and the global identifier is used permanently.

(34) The method of (33), further comprising:

storing a relationship between the anonymous identifier and the global identifier.

(35) The method of anyone of (29) to (34), further comprising:

storing payment information of the user.

(36) The method of anyone of (29) to (35), further comprising:

handling a payment between the user and at least one of the mobility service provide and the mobility management provider.

(37) The method of anyone of (29) to (36), further comprising:

storing a preference of the user.

(38) The method of (37), wherein the preference includes at least one of a preferable transport system, a class usage and a special condition of the user.

(39) The method of anyone of (29) to (38), further comprising:

storing historical journey information.

(40) The method of (39), further comprising:
   updating historical journey information after a finishing of a journey of the user.

(41) A terminal device comprising circuitry configured to:
   authenticate a user of the terminal device at a communication network node, such that the communication network node requests an anonymous identifier for providing an anonymous identification of the user to a mobility service provider, wherein the request is directed to a communication network node for providing a distributed ledger.

(42) The terminal device of (41), the circuitry being further configured to:
   store the anonymous identifier in an identifier wallet.

(43) The terminal device of (41) or (42), the circuitry being further configured to:
   track a position of the user for generating journey events of a journey of the user.

(44) The terminal device of (43), wherein the journey events include at least one of the following: passing a station gate, arrive at a destination, arrive with a predetermined vehicle, arrive at an intermediate point.

(45) The terminal device of anyone of (41) to (44), the circuitry being further configured to:
   initiate a finalization process of a journey when it is detected that the user arrived at a destination.

(46) A method for operating a terminal device, the method comprising:
   authenticating a user of the terminal device at a communication network node, such that the communication network node requests an anonymous identifier for providing an anonymous identification of the user to a mobility service provider, wherein the request is directed to a communication network node for providing a distributed ledger.

(47) The method of (46), further comprising:
   storing the anonymous identifier in an identifier wallet.

(48) The method of (46) or (47), further comprising:
   tracking a position of the user for generating journey events of a journey of the user.

(49) The method of (48), wherein the journey events include at least one of the following: passing a station gate, arrive at a destination, arrive with a predetermined vehicle, arrive at an intermediate point.

(50) The method of anyone of (46) to (49), further comprising:
   initiating a finalization process of a journey when it is detected that the user arrived at a destination.

(51) A communication network node for providing a mobility management provider, comprising circuitry configured to:
   provide candidate routes to a user based on a request of the user which is issued based on an anonymous identifier for providing an anonymous identification of the user to a mobility service provider, wherein the anonymous identifier is generated based on a request of a personal data management provider to the distributed ledger.

(52) The communication network node of (51), wherein the candidate routes are further provided based on a preferred transport system.

(53) The communication network node of (51) or (52), the circuitry being further configured to:
   generate support information for the user.

(54) The communication network node of (53), wherein the support information includes at least one of route guidance and navigation data.

(55) The communication network node of anyone of (51) to (54), the circuitry being further configured to:
   track a journey event.

(56) The communication network node of (55), wherein the journey event includes at least one of the following: passing a station gate, arriving at a destination, arriving with a predetermined vehicle, arriving at an intermediate point.

(57) The communication network node of anyone of (51) to (56), the circuitry being further configured to:
   calculate a revenue sharing with the mobility service provider.

(58) A method for providing a communication network node for providing a mobility management provider, the method comprising:
   providing candidate routes to a user based on a request of the user which is issued based on an anonymous identifier for providing an anonymous identification of the user to a mobility service provider, wherein the anonymous identifier is generated based on a request of a personal data management provider to the distributed ledger.

(59) The method of (58), wherein the candidate routes are further provided based on a preferred transport system.

(60) The method of (58) or (59), further comprising:
   generating support information for the user.

(61) The method of (60), wherein the support information includes at least one of route guidance and navigation data.

(62) The method of anyone of (58) to (61), further comprising:
   tracking journey events.

(63) The method of (62), wherein the journey events include at least one of the following: passing a station gate, arriving at a destination, arriving with a predetermined vehicle, arriving at an intermediate point.

(64) The method of anyone of (58) to (63), further comprising:
   calculating a revenue sharing with the mobility service provider.

(65) A communication network node for providing a distributed ledger, comprising circuitry configured to:
   store an anonymous identifier which is generate in a distributed ledger for providing an anonymous identification of a user of a mobility management provider to a mobility service provider, wherein the anonymous identifier is generated based on a request of a personal data management provider.

(66) The communication network node of (65), the circuitry being further configured to:
   store at least one of the following: a time stamp, a mobility service subscription of the user, a validation of a ticket, a journey event, a location of the user, a mobility service provider, and transport cost.

(67) A method for providing a communication network node for providing a distributed ledger, the method comprising:
   storing an anonymous identifier which is generate in a distributed ledger for providing an anonymous identification of a user of a mobility management provider to a mobility service provider, wherein the anonymous identifier is generated based on a request of a personal data management provider.

(68) The method of (67), further comprising:
   storing at least one of the following: a time stamp, a mobility service subscription of the user, a validation of a ticket, a journey event, a location of the user, a mobility service provider, and transport cost.

(69) A communication network node for providing a mobility service provider, comprising circuitry configured to:

accept an anonymous identifier of a user for booking a journey with the mobility service provider, wherein the anonymous identifier is generated for providing an anonymous identification of the user of a mobility management provider to the mobility service provider, wherein the anonymous identifier is generated based on a request of a personal data management provider to a distributed ledger.

(70) The communication network node of (69), the circuitry being further configured to:

issue a journey ticket based on the anonymous identifier.

(71) The communication network node of (69) or (70), the circuitry being further configured to:

record a journey event.

(72) The communication network node of (71), wherein the journey event includes at least one of the following: passing a station gate, arriving at a destination, arriving with a predetermined vehicle, arriving at an intermediate point.

(73) The communication network node of anyone of (69) to (72), the circuitry being further configured to:

record a revenue sharing calculation at a distributed ledger.

(74) A method for providing a communication network node for providing a mobility service provider, the method comprising:

accepting an anonymous identifier of a user for booking a journey with the mobility service provider, wherein the anonymous identifier is generated for providing an anonymous identification of the user of a mobility management provider to the mobility service provider, wherein the anonymous identifier is generated based on a request of a personal data management provider to a distributed ledger.

(75) The method of (74), further comprising:

issuing a journey ticket based on the anonymous identifier.

(76) The method of (74) or (75), further comprising:

recording a journey event.

(77) The method of (76), wherein the journey event includes at least one of the following: passing a station gate, arriving at a destination, arriving with a predetermined vehicle, arriving at an intermediate point.

(78) The method of anyone of (74) to (77), further comprising:

recording a revenue sharing calculation at a distributed ledger.

(79) A method for a communication network, comprising:

generating an anonymous identifier for providing an anonymous identification of a user of a mobility management provider to a mobility service provider, wherein the anonymous identifier is generated based on a request of a personal data management provider to the distributed ledger.

(80) The method of (79), further comprising:

authenticating the user, based on a global identifier, to the personal data management provider for requesting the anonymous identifier.

(81) The method of (79) or (80), further comprising:

receiving the anonymous identifier in the personal data management provider.

(82) The method of anyone of (79) to (81), further comprising:

storing the anonymous identifier in a terminal device of the user.

(83) A method for a communication network, comprising:

selecting a journey route for a user to reach a destination, wherein the user uses an anonymous identifier for providing an anonymous identification of a user of a mobility management provider to a mobility service provider, wherein the anonymous identifier is generated based on a request of a personal data management provider to the distributed ledger.

(84) The method of (83), further comprising:

requesting, by the mobility management provider, an authorization at the personal data management provider.

(85) The method of (83) or (84), further comprising:

transmitting, from the personal data management provider to the mobility management provider, at least one of a preference of the user and a journey history of the user.

(86) The method of anyone of (83) to (85), further comprising:

providing a plurality of candidate routes to the mobility management provider by the mobility service provider.

(87) A method for a communication network, comprising:

issue a journey ticket based on a credential of a user, wherein the credential is based on an anonymous identifier for providing an anonymous identification of the user of a mobility management provider to a mobility service provider, wherein the anonymous identifier is generated based on a request of a personal data management provider to the distributed ledger.

(88) The method of (87), further comprising:

authorizing, by the personal data management system, a selected journey for the mobility management provider.

(89) The method of (87) or (88), further comprising:

requesting, by the mobility management provider, a mobility service at the mobility service provider.

(90) The method of anyone of (87) to (89), further comprising:

requesting, by the mobility service provider, the credential at the distributed ledger; and issuing the journey ticket based on the credential.

(91) The method of anyone of (87) to (90), further comprising:

transmitting, by the mobility management provider, the journey ticket to the user.

(92) A method for a communication network, comprising:

verifying a journey ticket based on a credential of a user, wherein the credential is based on an anonymous identifier for providing an anonymous identification of the user of a mobility management provider to a mobility service provider, wherein the anonymous identifier is generated based on a request of a personal data management provider to the distributed ledger.

(93) The method of (92), further comprising:

transmitting the credential from a terminal device of the user to the mobility service provider.

(94) The method of (93), further comprising:

verifying, by the mobility service provider, the credential at the distributed ledger.

(95) The method of (94), further comprising:
    generating a journey event based on the verification of the credential;
    recording the journey event is a distributed ledger.
(96) The method of (95), wherein the distributed ledger is a blockchain.
(97) A method for a communication network, comprising:
    finalizing a journey of a user based on a detection of a terminal device of a user, wherein the terminal device stores an anonymous identifier for providing an anonymous identification of the user of a mobility management provider to a mobility service provider, wherein the anonymous identifier is generated based on a request of a personal data management provider to the distributed ledger.
(98) The method of (97), further comprising:
    closing a journey ticket in the distributed ledger based on a request of the mobility service provider.
(99) The method of (97) or (98), further comprising:
    recording the journey in a distributed ledger based on a request of the mobility service provider.
(100) The method of (99), wherein the distributed ledger is a blockchain.
(101) A method for a communication network, comprising:
    sharing a revenue of a journey of a user using a journey ticket which is based on a credential based on an anonymous identifier for providing an anonymous identification of the user of a mobility management provider to a mobility service provider, wherein the anonymous identifier is generated based on a request of a personal data management provider to the distributed ledger.
(102) The method of (101), further comprising:
    requesting, by the mobility service provider, a record of the journey with the anonymous identifier at a distributed ledger.
(103) The method of (102), wherein the distributed ledger is a blockchain.
(104) The method of anyone of (101) to (103), further comprising:
    determining an amount of revenue to be shared with the mobility management provider based on the anonymous identifier.
(105) The method of (104), further comprising:
    identifying the user in the personal data management provider based on the anonymous identifier.

The invention claimed is:

1. A communication network node for providing a distributed ledger, the communication network node comprising:
    a dedicated Distributed Identifier/Self-Sovereign Identity (DID/SSI) ledger corresponding to the communication network node; and
    circuitry configured to:
        transmit a request for an anonymous identifier from a separate personal data management provider to the communication network node for providing the distributed ledger;
        generate the anonymous identifier for providing an anonymous identification of a user of a mobility management provider, the anonymous identifier being a newly created, unique identifier valid for a single predetermined period or a single service transaction; and
        provide the anonymous identification of the user of the mobility management provider to a mobility service provider, the mobility service provider being a transport operator or a booking system accepting the anonymous identification as a valid credential.
2. The communication network node of claim 1, wherein the anonymous identifier is used temporarily as the identifier valid for the single predetermined period or the single service transaction.
3. The communication network node of claim 1, the circuitry being further configured to:
    issue a credential for the user based on the anonymous ID.
4. The communication network node of claim 3, the circuitry being further configured to:
    verify the credential based on a request of the mobility service provider.
5. The communication network node of claim 4, wherein the request is based on at least one of the following: a validity of a ticket and a condition of a driving license.
6. The communication network node of claim 3, the circuitry being further configured to:
    revoke the credential based on a predetermined event by notifying the dedicated DID/SSI ledger.
7. The communication network node of claim 1, the circuitry being further configured to:
    generate the anonymous identifier as the newly created, unique identifier valid for the single predetermined period or the single service transaction for every request of the personal data management provider to the communication network node for providing the distributed ledger.
8. The communication network node of claim 1, wherein the user is associated with a global identifier, and only the personal data management provider stores and controls access to a relation between the global identifier of the user and the anonymous identifier, thereby preserving anonymity of the user from the mobility service provider.
9. The communication network node of claim 1, wherein the mobility service provider is selected from a group consisting of a railway company, a bus company, a taxi operator, and a vehicle sharing system.
10. A method for providing a communication network node including a dedicated Distributed Identifier/Self-Sovereign Identity (DID/SSI) ledger for providing a distributed ledger, the method comprising:
    transmitting a request for an anonymous identifier from a separate personal data management provider to the communication network node for providing the distributed ledger;
    generating the anonymous identifier for providing an anonymous identification of a user of a mobility management provider, the anonymous identifier being a newly created, unique identifier valid for a single predetermined period or a single service transaction; and
    providing the anonymous identification of the user of the mobility management provider to a mobility service provider, the mobility service provider being a transport operator or a booking system accepting the anonymous identification as a valid credential.
11. The method of claim 10, wherein the anonymous identifier is used temporarily as the identifier valid for the single predetermined period or the single service transaction.
12. The method of claim 10, further comprising:
    issuing a credential for the user based on the anonymous ID.

13. The method of claim 12, further comprising:
verifying the credential based on a request of the mobility service provider.

14. The method of claim 13, wherein the request is based on at least one of the following: a validity of a ticket and a condition of a driving license.

15. The method of claim 12, further comprising:
revoking the credential based on a predetermined event by notifying the dedicated DID/SSI ledger.

16. The method of claim 15, wherein the predetermined event includes at least one of the following: expiry of a date, expiry of a ticket, end of a service contract.

17. The method of claim 10, wherein the mobility service provider is selected from a group consisting of a railway company, a bus company, a taxi operator, and a vehicle sharing system.

18. A terminal device comprising circuitry configured to:
operate within a system comprising a personal data management provider, a mobility service provider, and a communication network node for providing a distributed ledger;
authenticate a user of the terminal device at the personal data management provider that maintains a global unique identifier for the user; and
cause the personal data management provider to:
direct a request for an anonymous identifier for providing an anonymous identification of the user to the communication network node for providing the distributed ledger, the anonymous identifier being a newly created, unique identifier valid for a single predetermined period or a single service transaction; and
provide the anonymous identification of the user to the mobility service provider, the mobility service provider being a transport operator or a booking system accepting the anonymous identification as a valid credential.

19. The terminal device of claim 18, the circuitry being further configured to:
store the anonymous identifier in an identifier wallet.

20. The terminal device of claim 18, the circuitry being further configured to:
track a position of the user for generating journey events of a journey of the user.

21. The terminal device of claim 20, wherein the journey events include at least one of the following: passing a station gate, arrive at a destination, arrive with a predetermined vehicle, arrive at an intermediate point.

22. The terminal device of claim 18, the circuitry being further configured to:
initiate a finalization process of a journey when it is detected that the user arrived at a destination.

* * * * *